United States Patent
Kahl et al.

(10) Patent No.: US 10,320,198 B2
(45) Date of Patent: Jun. 11, 2019

(54) CONNECTOR IMPROVEMENTS

(71) Applicant: Jain Agricultural Services, LLC, Fresno, CA (US)

(72) Inventors: Anthony Kahl, Fitzroy (AU); Simon Holmes A Court, Fitzroy (AU)

(73) Assignee: Jain Agricultural Services Australia Pty Ltd, Victoria (AU)

( * ) Notice: Subject to any disclaimer, the term of this patent is extended or adjusted under 35 U.S.C. 154(b) by 0 days.

(21) Appl. No.: 15/564,808

(22) PCT Filed: Apr. 6, 2016

(86) PCT No.: PCT/AU2016/000116
§ 371 (c)(1),
(2) Date: Oct. 6, 2017

(87) PCT Pub. No.: WO2016/161472
PCT Pub. Date: Oct. 13, 2016

(65) Prior Publication Data
US 2018/0115167 A1 Apr. 26, 2018

(30) Foreign Application Priority Data

Apr. 6, 2015 (AU) .................................. 2015901231
Feb. 2, 2016 (AU) .................................. 2016900322

(51) Int. Cl.
*H02J 4/00* (2006.01)
*G06F 13/40* (2006.01)
*H01R 13/717* (2006.01)
*H01R 13/70* (2006.01)
*H01R 13/66* (2006.01)
(Continued)

(52) U.S. Cl.
CPC .............. *H02J 4/00* (2013.01); *G06F 13/409* (2013.01); *G06F 13/4081* (2013.01); *G06F 13/4282* (2013.01); *H01R 13/6683* (2013.01); *H01R 13/70* (2013.01); *H01R 13/7175* (2013.01); *G06F 3/044* (2013.01)

(58) Field of Classification Search
CPC ........ H02J 4/00; H02J 1/00; H02J 3/00; H02J 7/00; H01R 13/62; H01R 13/66; H01R 13/70; H01R 13/717; H01R 13/6683; H01R 27/00; G06F 13/14; G06F 13/38; G06F 13/42; G06F 12/02; G06F 3/048; G06F 3/044; G06F 3/046
USPC ........ 307/40, 11, 64, 66; 439/218, 668, 669, 439/221–234; 715/853, 855, 856, 852; 710/305, 303
See application file for complete search history.

(56) References Cited

U.S. PATENT DOCUMENTS 5,225,816 A * 7/1993 Lebby ...................... G06F 1/16
340/540
5,459,453 A 10/1995 Minerd
(Continued)

OTHER PUBLICATIONS

PCT International Search Report (ISA/210) and PCT Written Opinion (ISA/237) for PCT/AU2016/000116 dated Jun. 27, 2016.

*Primary Examiner* — Fritz M Fleming
*Assistant Examiner* — Jagdeep S Dhillon
(74) *Attorney, Agent, or Firm* — Baker Botts L.L.P.

(57) ABSTRACT

A connector to physically connect a plurality of devices, comprising: machine readable instructions, a user interface, and a processor wherein the connector is configured to sense a connection with a device and thereafter execute one or more commands.

11 Claims, 32 Drawing Sheets

(51) Int. Cl.
  *G06F 13/42*   (2006.01)
  *G06F 3/044*   (2006.01)

(56) References Cited

U.S. PATENT DOCUMENTS

| | | | |
|---|---|---|---|
| 5,729,204 | A | 3/1998 | Fackler |
| 6,243,654 | B1 | 6/2001 | Johnson |
| 6,786,765 | B2 | 9/2004 | Bauermeister |
| 8,686,593 | B2 * | 4/2014 | Chang ........................ H02J 9/06 |
| | | | 307/64 |
| 2003/0207603 | A1 * | 11/2003 | Potega ................... H01R 24/58 |
| | | | 439/218 |
| 2005/0215119 | A1 | 9/2005 | Kaneko |
| 2008/0125911 | A1 * | 5/2008 | Ebrom ...................... G06F 9/54 |
| | | | 700/275 |
| 2010/0005425 | A1 * | 1/2010 | Kodosky ............. G06F 3/04817 |
| | | | 715/853 |
| 2012/0309215 | A1 * | 12/2012 | Dick ........................ H02J 3/38 |
| | | | 439/300 |
| 2017/0249269 | A1 * | 8/2017 | Bodley ................. G06F 13/385 |

* cited by examiner

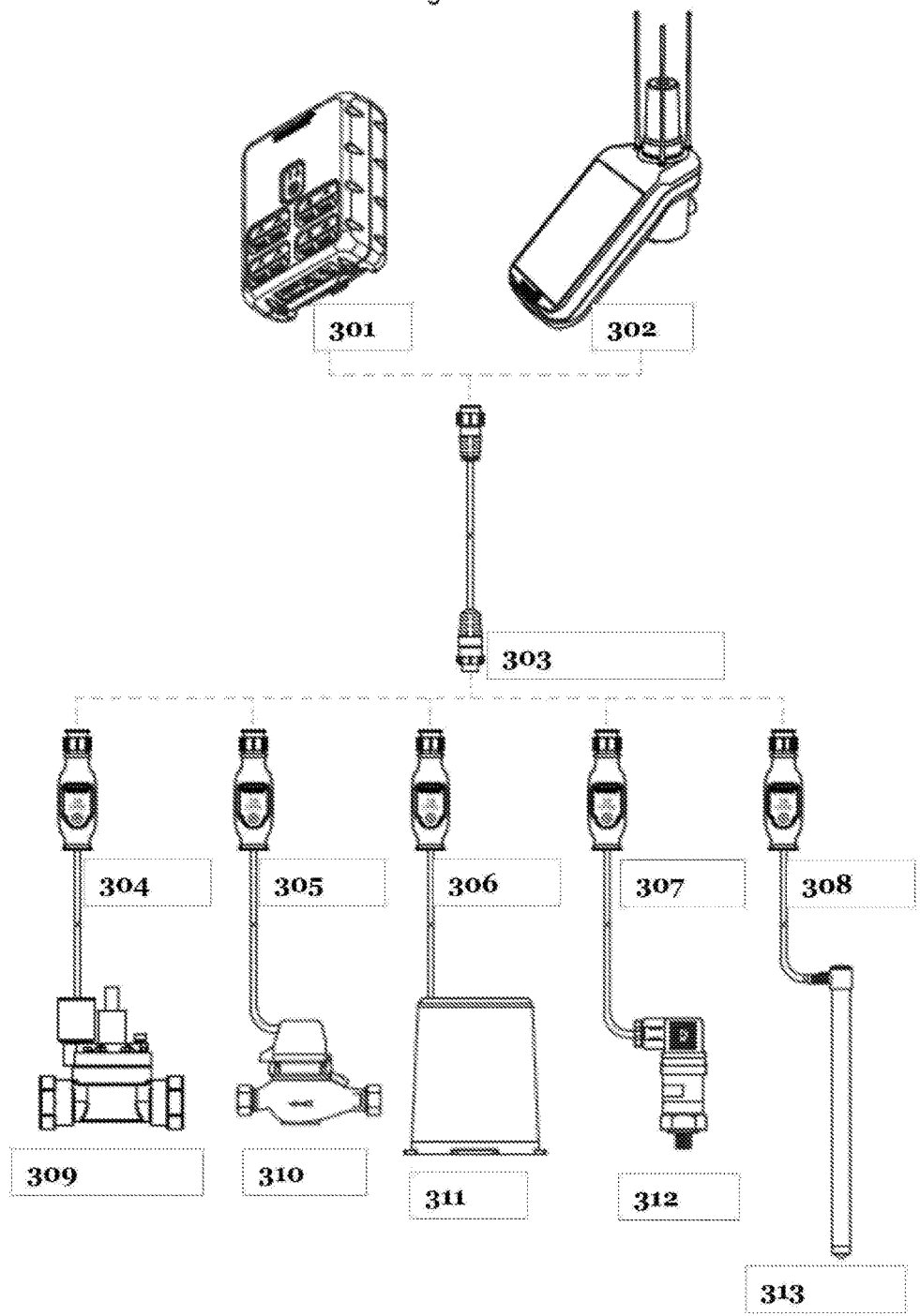

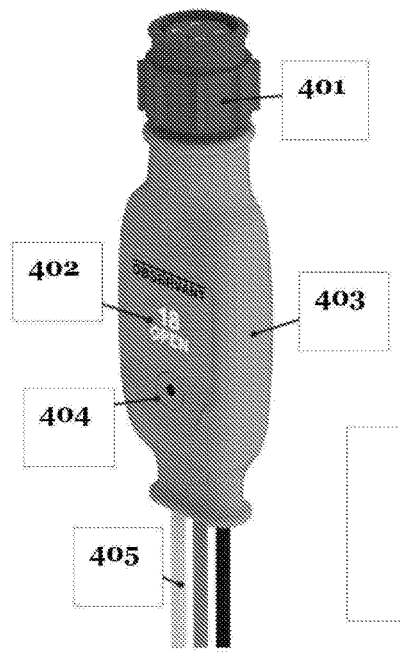
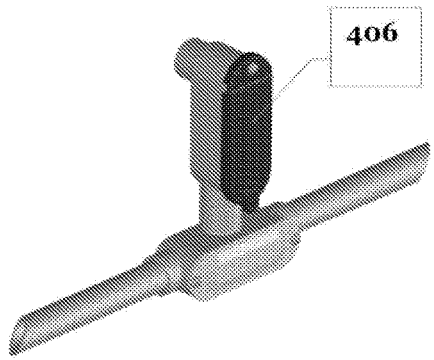
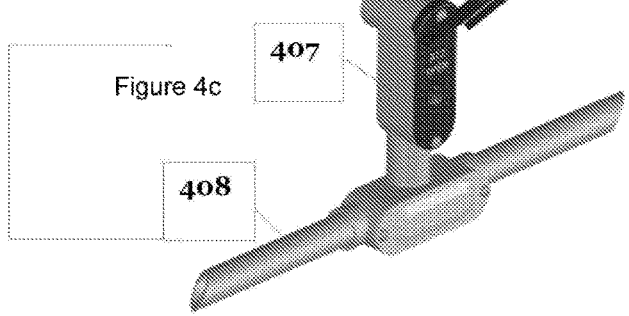
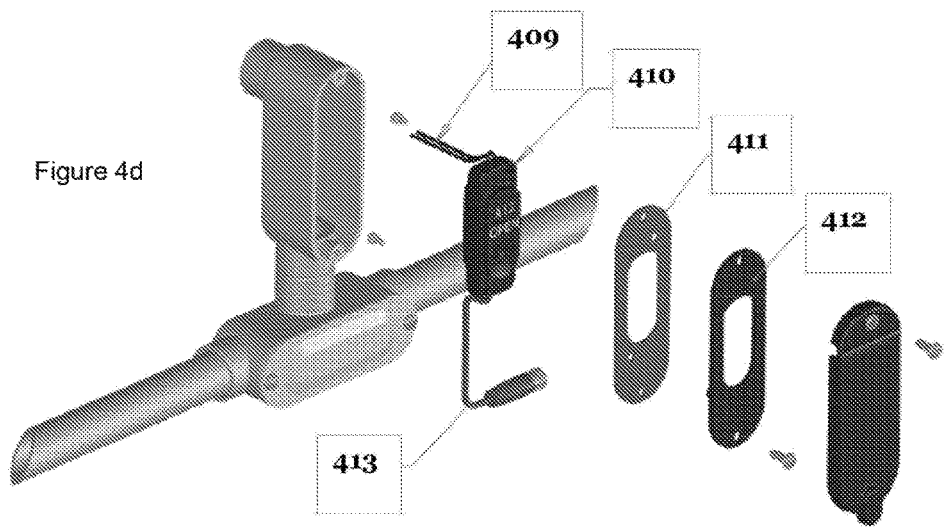
Figure 4a
Figure 4b
Figure 4c
Figure 4d

Figure 6
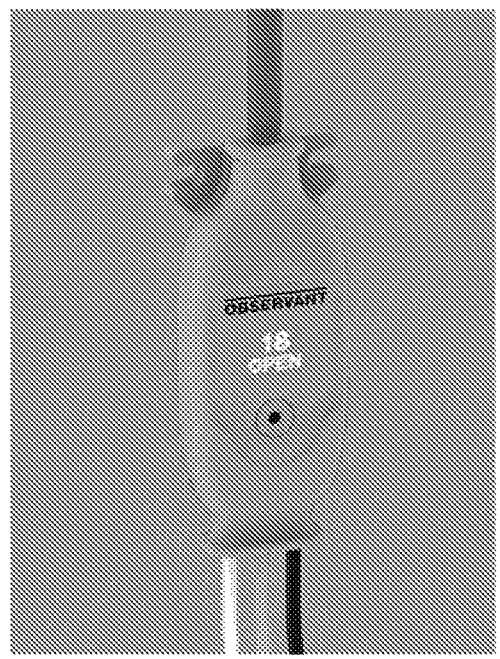
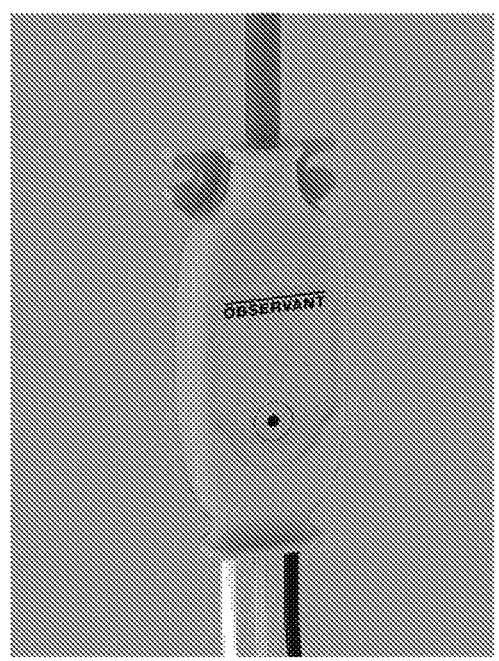

Vibrator

Touch button

RGB LED

Firing capacitor and charging 2W or 3W connector

H-bridge

Programming header

ID EEPROM

Address: 0x51 (A1 = 0, A0 = 1)

HW type
0 - Solenoid [SOL]
1 - loop 4 to 20 mA [420]
2 - Counter [CNT]
3 - Sensor [485]
4 - Sensor [232]
5 - Sensor [SDI]
6 - Sensor [10V]

RGB LED

Touch button

Tactile button and wakeup signalling

Firing capacitor and charging 2 wire connector

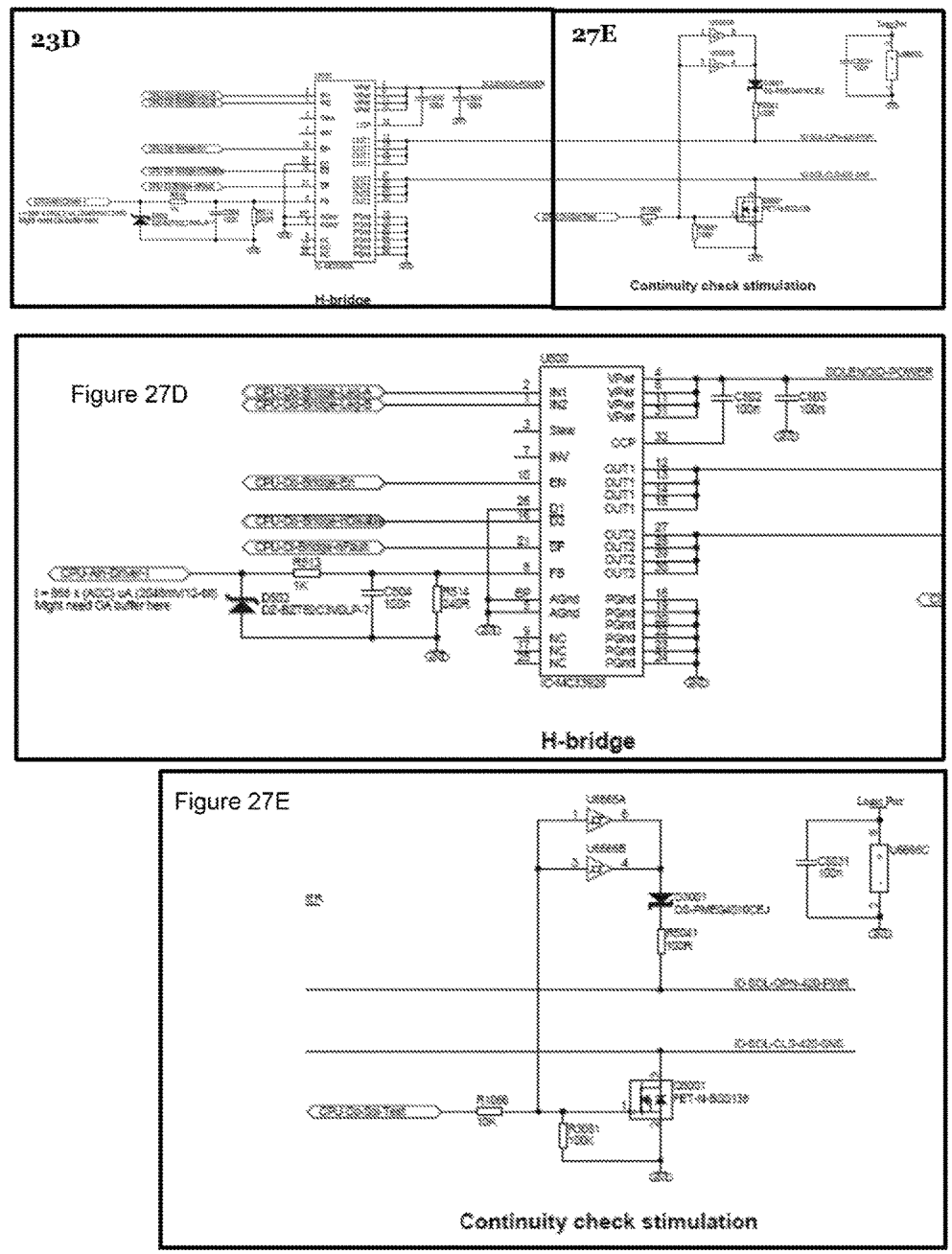

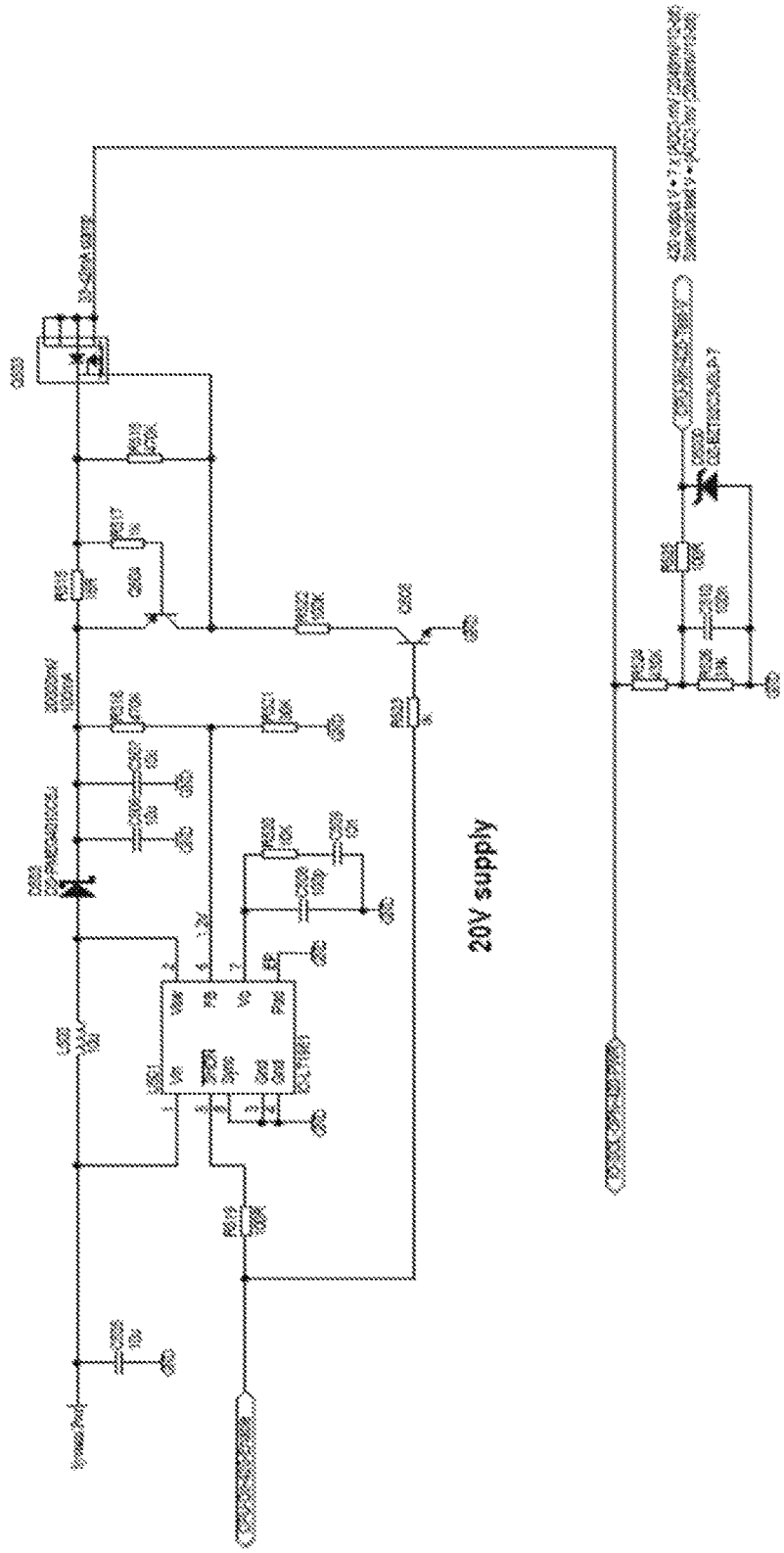

4-20mA sense

CONNECTOR IMPROVEMENTS

PRIORITY

This nonprovisional application is a U.S. National Stage Filing under 35 U.S.C. § 371of International Patent Application Serial No. PCT/AU2016/000116 filed Apr. 6, 2016, and entitled "Connector Improvements" which claims priority to Australian Patent Application No. 2015901231 filed Apr. 6, 2015 and Australian Patent Application No. 2016900322 filed Feb. 2, 2016, all of which are hereby incorporated by reference in their entirety.

BACKGROUND OF THE INVENTION

A continuing issue in areas in which multiple pieces of equipment are interfaced (for example in monitoring equipment, for example in agriculture or other industries) is the use of effective connections between them. It is not unusual for the number of cables to become unwieldy so that they become entangled and difficult to manage. In addition, the wide variety of cable and connection types available can cause greater complexity and lost time and efficiency. In some instances, some of such cables are not recognised or the equipment which they connect to is not recognised, causing further delay in configuration. Power usage requirements by various pieces of equipment and potential incompatibilities with cabling can present further problems. In addition, the types of input can in some cases be inconsistent with standard cabling, for eg. pulse, vs analog vs serial inputs. Power control, installation requirements and testing can also vary considerably between pieces of equipment and their cabling.

The reference to any prior art in this specification is not, and should not be taken as, an acknowledgement or any form of suggestion that the prior art forms part of the common general knowledge.

SUMMARY OF THE INVENTION

According to one aspect of the invention, there is provided a connector to physically connect a plurality of devices, comprising: a plurality of connection elements, machine readable instructions and a processor.

According to another aspect of the invention, there is provided a connector to physically connect a plurality of devices, comprising: a plurality of connection elements, machine readable instructions, a user interface, and a processor.

According to another aspect of the invention, there is provided a connector to physically connect a plurality of devices, comprising: a plurality of connection elements, machine readable instructions, a processor and input/output hardware.

According to another aspect of the invention, there is provided a connector to physically connect a plurality of devices, comprising: machine readable instructions, a user interface, and a processor wherein the connector is configured to sense a connection with a device and thereafter execute one or more commands. In some preferred embodiments, the connector connects a peripheral device to a controlling device, such as a telemetry device. However, a connector according to the invention may equally connect any physically practicable number of devices of any type.

In one aspect of the invention there is provided a non-transitory computer-readable medium storing instructions for execution by a processor to control a first electronic device, the instructions including: code to store information in relation to at least one additional electronic device; code to control the first electronic device to process signals from the at least one additional electronic device; code to perform a function of the first electronic device based on the processed signals output from the addition electronic device. In some embodiments the non-transitory computer-readable medium storing instructions of this aspect may additionally comprise one or more of: code to receive instructions from a user interface (UI); code to cause display on a user interface (for example an LED); code to enable interoperability with a sensor; code to enable interoperability with an effector (such as a solenoid, a switch, a pump, a valve, etc); code to enable auto detection of a $3^{rd}$ party device.

The machine readable instructions may be stored on the device in any suitable manner, for example on a local flash drive, hard disk, etc. The user interface may be of any suitable type. In some preferred embodiments it is a simple interface and in some embodiments it is designed for robustness in the field. Thus in some such embodiments, the user interface comprises an over-moulded OLED and a button. In such embodiments, the OLED is protected from external conditions (such as the weather) and in some implementations may not be visible unless it is on, in which case it will shine through the over-moulded casing. Similarly a simple button may be located beneath a skin of rubber or other suitable protective covering such as an outer shell.

The processor of the invention may be of any suitable type. Certain preferred embodiments relate to devices for which careful power management is important. In such embodiments, the processor will be chosen to match the power requirements without compromising minimum computing requirements. Sensing of a connection with another device may be done in any suitable way, for example with 'plug and play' type implementations, which for example sense an electric current via a connection, for example a USB connection.

It will be appreciated by the skilled addressee that a connector according to the invention is capable of dramatically simplifying installation and improving reliability of the connected equipment. Some embodiments of the invention are for use in particular applications, for example, surveillance, monitoring, agriculture, mining, property management, and so on. In some embodiments the connectors of the invention may be used to connect a large range of different types of devices for example, gates, mechanical devices, digital devices, valves, pumps, sensors, cameras, solenoids, etc.

Some preferred embodiments of the invention require close management of power, for example those which relate to remote telemetry-enabled devices, for example in in areas such as water management, agriculture or mining. Such embodiments comprise computer instructions directed at carefully managing power use and optimising it in accordance with computing and other requirements. As stated above, the connector of the invention may be used for a wide variety of different devices, and may for example be used to support a large number of such devices and control distributed networks of such devices. In some preferred embodiments, the connector of the invention is used to support multiple different types of device and control distributed devices, such as for example solenoids.

In some preferred embodiments, the connector of the invention will perform certain routine functions each time it is connected to a device. For example, after sensing the type of device, it may set an address for the connector for example with a controller, and commence executing instructions to configure the device.

Certain implementations of the invention relate to remote telemetry applications and may therefore operate equipment (such as solenoids) infrequently. In some examples, they will operate a few times a day, though more or less frequent operation may also be possible if required. In such examples, power consumption is not a concern as long as it remains within the existing instantaneous capacity of the telemetry power supply.

A device according to the invention reduces complexity and cost of equipment to be used with it (such as telemetry apparatus) by reducing or eliminating oftentimes little used Input/Output (IO) hardware. For a company developing and releasing such equipment, putting the IO capability into the cable also allows faster development of new interfaces without any changes to base products, which may for example have far higher costs, for example in relation to setup, validation, compliance and testing.

Connection elements of the device enable it to physically connect to other hardware. For example, in implementations of the device of the invention in which it is a simple connector, it may comprise at least two connection elements, which may for example comprise wires attached to ports specific to the hardware elements to be attached to each. Connection elements may be of any suitable type, for example, they may be a serial data communications port, D-submarine, USB, screw terminal, keyring, terminal block, blade, ring and spade, 8P8C, etc. Preferably they are of a type that is sufficiently robust for the application at hand.

Throughout this specification (including any claims which follow), unless the context requires otherwise, the word 'comprise', and variations such as 'comprises' and 'comprising', will be understood to imply the inclusion of a stated integer or step or group of integers or steps but not the exclusion of any other integer or step or group of integers or steps.

BRIEF DESCRIPTION OF THE DRAWINGS

FIG. 3 depicts example uses of a connector according to the invention.

FIGS. 4a-4h depict example connectors according to the invention.

FIG. 6 shows an example embodiment of the invention in the on and off configuration.

FIGS. 22 to 28B show example electronic circuit diagrams for the components shown in FIG. 9.

DETAILED DESCRIPTION OF EXEMPLARY EMBODIMENTS

It is convenient to describe the invention herein in relation to particularly preferred embodiments. However, the invention is applicable to a wide range of implementations and it is to be appreciated that other constructions and arrangements are also considered as falling within the scope of the invention. Various modifications, alterations, variations and or additions to the construction and arrangements described herein are also considered as falling within the ambit and scope of the present invention.

Figure 1:
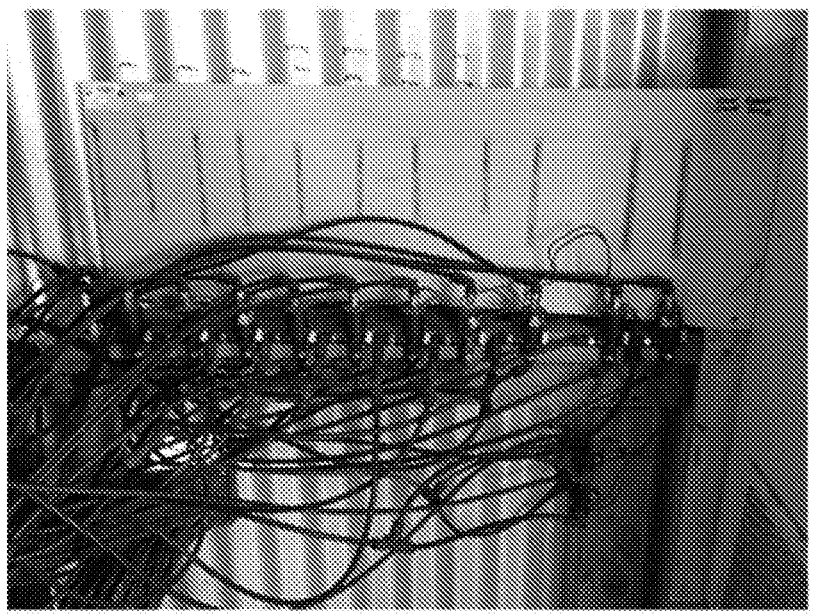
FIGS. 1 and 2 depict example prior art installations.
Figure 2:
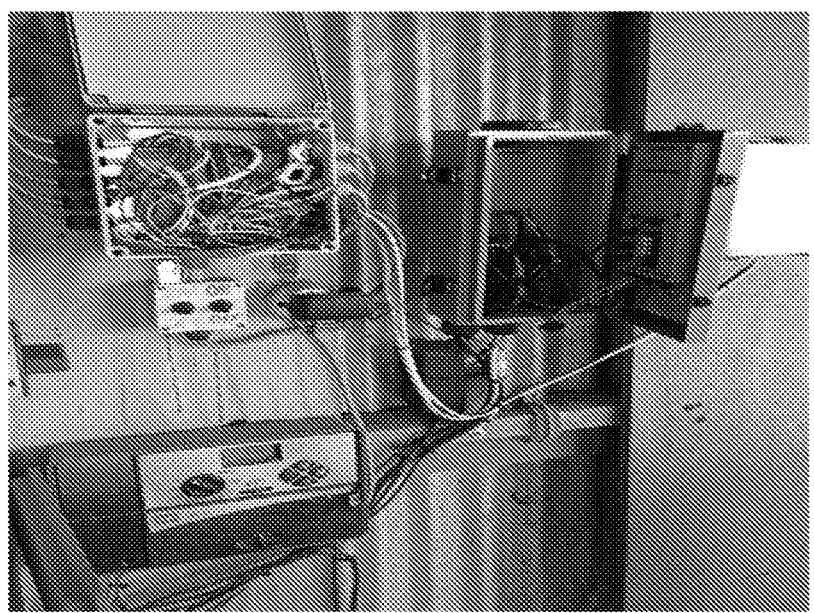

FIGS. 1 and 2 depict example prior art installations in which a large number of cables have made the installation unwieldy to manage. FIG. 3 depicts example uses of a device according to the invention in which 301 and 302 are example telemetry units. Pre-terminated cable 303 connects to any one of devices 309 to 314 and in some embodiments multiple such devices are connected to a telemetry unit such as 301 or 302 via one or more pre-terminated cables 303. The versatility of the connector of the invention is evident from the range of devices and communication types depicted. However, the skilled addressee will appreciate that the invention is not limited to such devices or communication means. As an example only, any one or more of the following can be readily connected, configured, used and maintained with the connector of the invention: latching DC solenoid 309 (using solenoid interface 304), flow meter 310 (using pulse interface 305), rain gauge 311 (using pulse interface 306), pressure sensor 312 (using analog interface 307) and soil moisture probe 313 (using serial interface 308).

FIG. 4a depicts another example device of the invention in which 401 is an integrated waterproof connector, 402 is an under skin OLED display, 403 depicts over-moulded encapsulation, 404 depicts a touch/mechanical push button and 405 depicts cabling, for example to a solenoid or other device.

FIGS. 4b-d depict further alternative embodiments of a connector according to the invention in which:
  406 is a protective rubber/plastic cover;
  407 is a metal or plastic US ½" junction box;
  408 is metal or plastic US ½" rigid conduit;
  409 is a solenoid electrical connection;
  410 is a smart cable dongle with OLED display;
  411 is a junction box seal;
  412 is a metal bezel/junction box cover; and
  413 is a pluggable and field wire-able multi-drop cabling system.

Figure 4E:
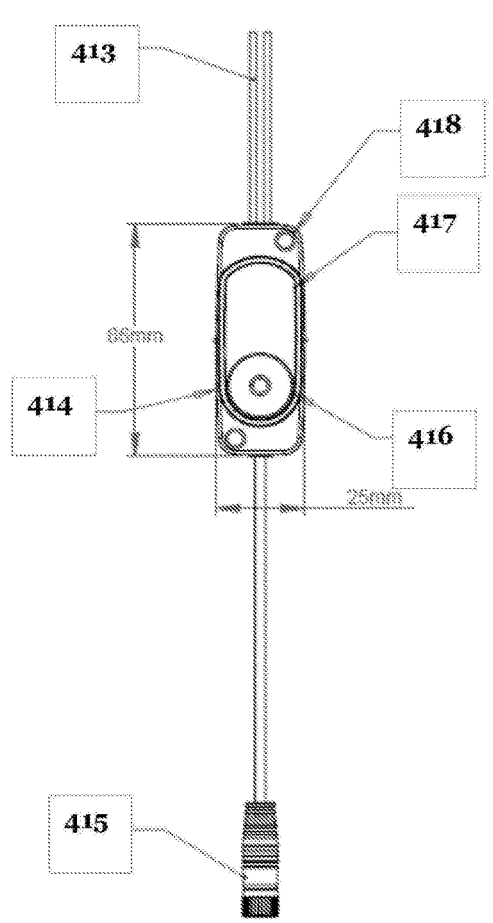

FIG. 4e depicts another example device according to the invention in which:
  413 is a sensor/solenoid electrical connection;
  414 is an encapsulated electronics module;
  415 is an M8, threaded, 4-way, communications/power connection tail;
  416 is a hybrid tactile/touch gesture user input;
  417 is a hidden OLED display; and
  418 are mounting holes for attachment for example to a wall or face plate.

Figure 4F:
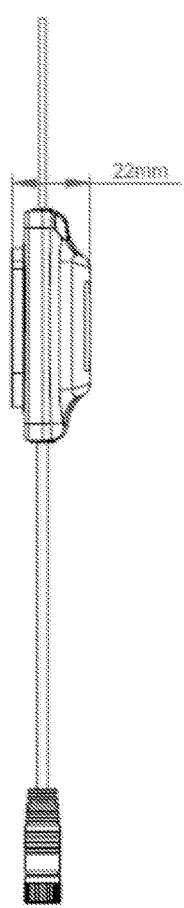
Figure 4G:
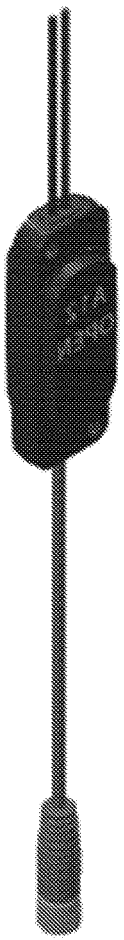
Figure 4H:
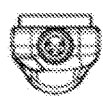

FIGS. 4f, 4g and 4h are alternative views of the device of FIG. 4e.

Figure 5A:
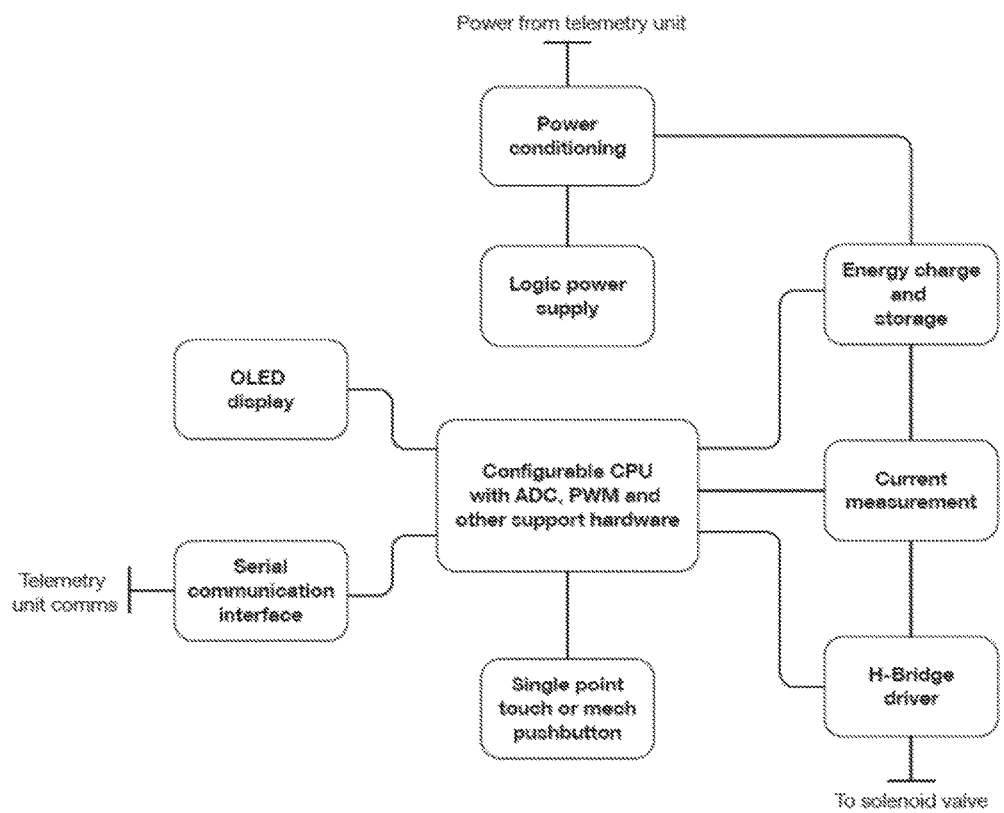
FIG. 5a is a chart showing example features of a connector according to the invention.

FIG. 5a is a chart showing example features of a device according to the invention. In this example embodiment, power is received from the telemetry unit, and is conditioned and supplied to the connector, including logic power supply. The unit is capable of storing energy and this can be managed by the configurable CPU which is at the centre of the chart. The CPU is configurable with support hardware such as Analog to Digital Converter (ADC), Pulse Width Modulation (PWM), etc. The connector may be managed using a single point touch or a mechanical pushbutton. The connector has an Organic Light Emitting Diode (OLED) display and a serial communication interface, for example to a communications device, such as a telemetry unit communications system/module.

Figure 5B:
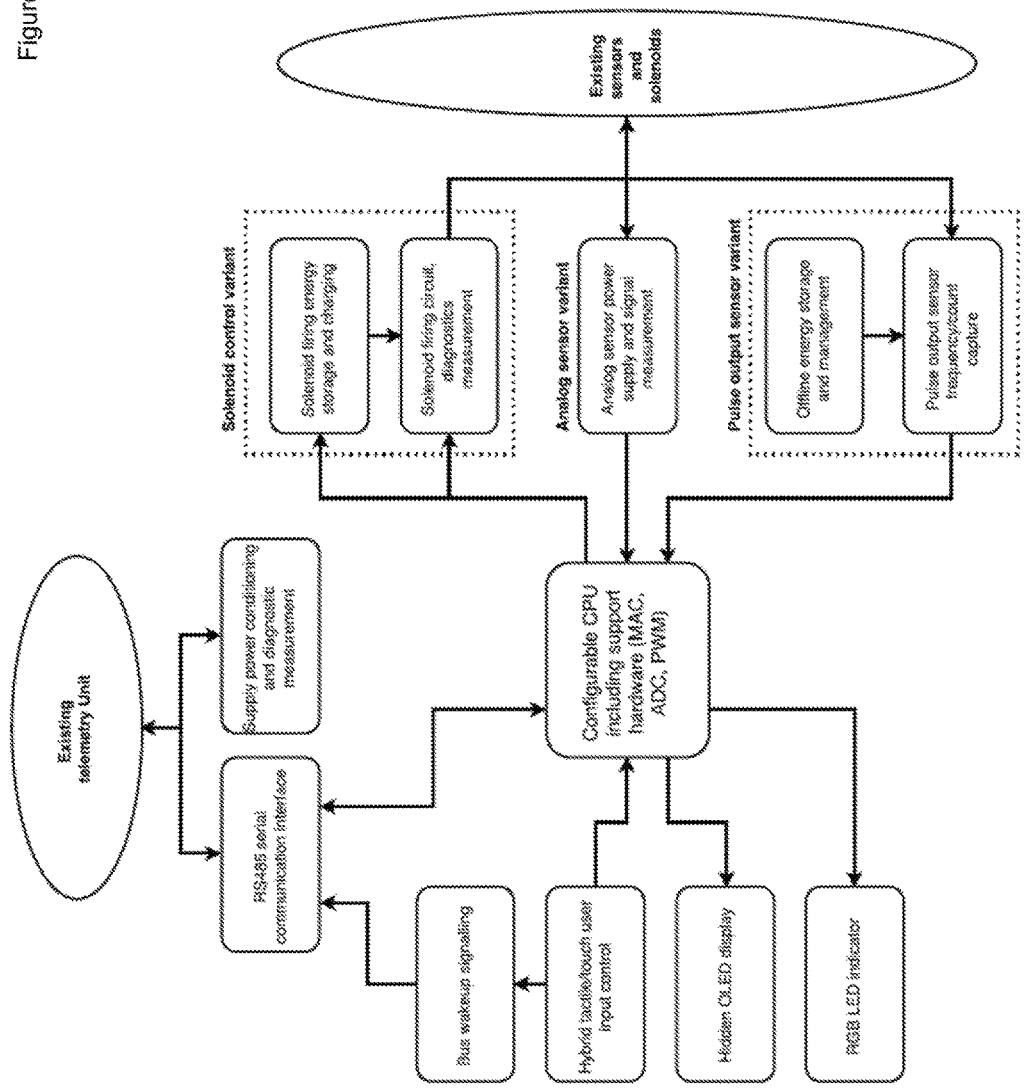
FIG. 5b is a chart showing example cable/connector hardware blocks for an example device according to the invention.

FIG. 5b is a chart showing hardware blocks for a connector according to one embodiment of the invention. The connector comprises a configurable CPU (depicted at the centre of the chart) which provides instructions to various hardware elements of the connector, including for example an RCB LED indicator, a hidden OLED display, a hybrid tactile/touch user input control. In this example there are three variants of the connector, a solenoid control variant, an analog sensor variant and a pulse output sensor variant.

In this example, the solenoid control variant may receive input from the CPU in relation to (a) solenoid firing energy storage and charging, and (b) solenoid firing circuit, diagnostics measurement. The pulse output sensor variant may control offline energy storage and management which may provide input to enable pulse output sensor frequency/count capture—which may also be part of the pulse sensor variant. The solenoid firing circuit, diagnostics measurement element of the solenoid control variant may provide input into the pulse output sensor frequency/count capture function of the pulse output sensor. The analog sensor variant controls analog sensor power supply and signal measurement and may receive input from and provide input to sensors and solenoids.

The CPU of this example may also receive input from and provide input to a telemetry unit via a serial communication interface such as an RS485 interface. Another function related to an existing telemetry unit may be supply power conditioning and diagnostic measurement.

Figure 7:
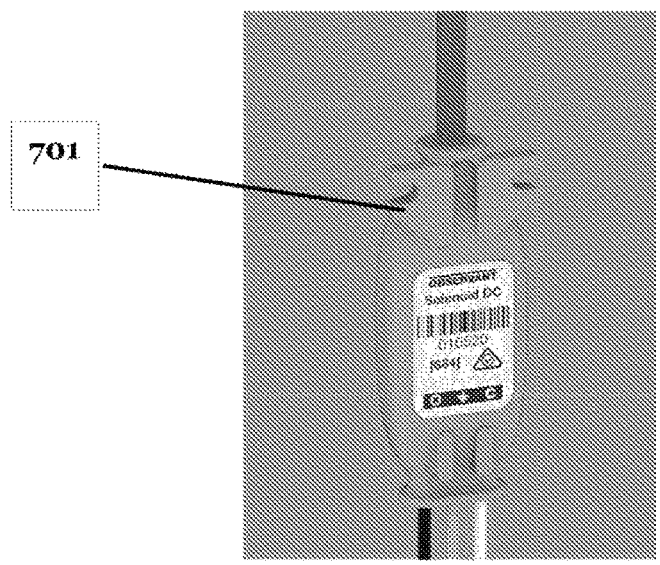
FIG. 7 depicts an example embodiment of the invention.
Figure 8:
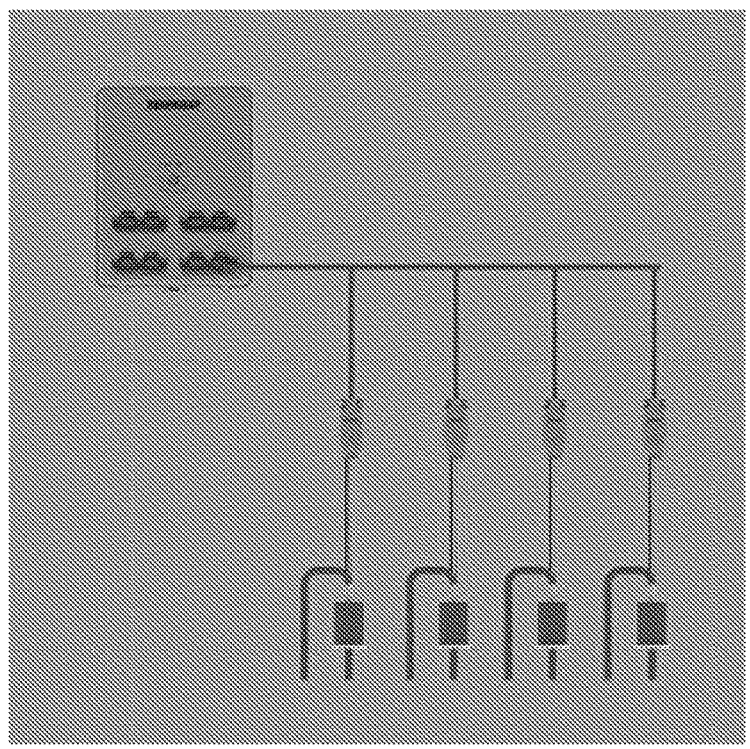
FIG. 8 depicts another example embodiment of the invention in which multiple connectors of the invention are used.

FIG. 6 shows an example embodiment of the invention in the on and off configuration and FIG. 7 depicts another view of the embodiment of FIG. 6 showing wings 701 which allow the device to be fixed at a particular location. FIG. 8 depicts another example embodiment of the invention in which multiple devices of the invention are used.

A connector of the invention comprises a user interface and computer readable instructions to enable interaction with one or more devices. Such embodiments may be configured to enable one or more of:
  Tighter control of "plug and play" highly supported sensing and control options.
  The use of a limited set of pre-terminated cable connections across for example a pre-determined range.
  Auto detection of a 3rd party device connected for example, though hardcoded identification within the cable. (For example, one might buy a cable specifically for a certain model of tipping bucket rain gauge, or a pulse-per-liter flow meter etc.)
  Zero configuration installation, from physical sensor to web data delivery.
  Ease of development of interfaces for sensors with special requirements eg. those requiring a 5 VDC power supply instead of a standard 12 VDC.
  Testing and commissioning locally. For example, one may test the device using the user interface built into the cable.

In some embodiments, for sensors requiring permanent power or monitoring (eg. a tipping bucket rain gauge) the cable may for example request power (current and time) with a maximum un-powered/non-update period. During the period when the cable is powered (nominally for data retrieval, but extended as required) internal circuitry may charge up, allowing simple monitoring such as input counting to take place for the period until the next powering or "power refresh".

In some embodiments, a connector according to the invention may comprise additional flexibility in use, for example by comprising one or more of:
  Pulse input—for example for rain gauges, flow meters, etc.
  Analog input (for example, 0-10 V, 4-20 mA)—for example, for pressure sensors, level sensors, etc.
  Serial protocol (for example SDI-12, 485, 232)

In some embodiments, a connector according to the invention is for use specifically with one or more irrigation systems. One of the challenges of irrigation automation in the horticultural sector is to be able to provide higher density device control without adding significant product or installation costs to the control point. In particular the controlling of banks of small irrigation solenoids poses a significant challenge from a hardware point of view.

In some embodiments, the present invention provides a single method of interfacing 1 or more solenoids (a mnumber limited only by power availability) to a remote management platform. Various embodiments of the invention provide one or more of the following advantages:
  Be relatively inexpensive on a per solenoid basis
  Accommodate 2 and 3 wire, latching and non-latching, AC and DC solenoid types
  Minimise the amount of cabling required at installation
  Be able to be powered from a standard power output of one of observant's telemetry platforms (so 12 VDC, <500 mA)
  Be able to request power to charge internal circuitry to allow firing of solenoid
  Allow many (for instance 24 or more, or alternatively up to 24, or alternatively up to 12) solenoids to be controlled from a single observant telemetry platform
  Detect solenoid operation and wiring faults without additional sensing (ie. though drive voltage and current monitoring only)
  Be controllable via a multi-drop/daisy chain serial communication protocol, the hardware layer of which likely being either RS485 or SDI-12
  Display valve opened/closed/fault status and address locally (address being something that can be set by the user to match irrigation user sensible zone/bay/line references)
  Allow the address and valve type to be changed locally (eg. at commissioning time)
  Allow the valve to be actuated/tested locally (eg. at commissioning time)
  Allow full installation and commissioning to take place without having to individually configure the device via software or serial protocol
  Optionally packaged as a bank of devices (for example, 2, 4, 8, 12, 16, 32, or any suitable number) for use with large manifold valve banks
  Reduce or manage wiring complexity if they are contained within a small area eg. a pump shed
  Manage and minimise the power required to activate Receive information about the state of a solenoid and reliably close the loop without adding additional wiring or hardware Easily test and diagnose problems with such installations Control many solenoids from a single telemetry platform Easily support in field or distributed collections of solenoids Fully commission and test at installation time eg. set solenoid station/zone/bank number~address In some embodiments, the invention provides an in-line dongle type connector device that can intelligently control a single device (such as a solenoid) via a serial communications bus (for example SDI-12 or RS485 or other) on which many such devices can communicate (and be powered). In some embodiments, this is via equipment, such as Observant's C3, Solo or Pico products. In some embodiments, the device of the invention is physically small (optionally approximately the size of a matchbox, optionally approximately the size of a thumbnail, or larger or smaller as required) and robust enough to be installed alongside a valve in a worst-case, in-field network (for example, buried or in a ground pit). In some embodiments, cabling becomes a matter of daisy-chaining 3 wires (power, communications, and ground) from one dongle to the next, the virtual address of each being able to be set mechanically on each device. In some embodiments, a simple status indicator can provide visual feedback on the state of the device and the solenoid attached, and a touch button allows for basic configuration and commissioning at install time.

In some implementations, a device according to the invention comprises a low-pressure over-moulded enclosure. For example, the electronics (once assembled and tested) may be placed in a mould, into which a plastic resin at relatively low temperature and pressure (when compared to typical injection moulding) is injected. The result should be a 'blob', free of air pockets and completely sealed to the elements. The screen may be implemented as an "under the skin" style in which the screen elements can be seen under the over-moulding when on, but when off it appears there is nothing there at all.

The following table sets out several examples of applications for a device according to the invention:

| Application | Requirements |
| --- | --- |
| Limited power (eg. wind, solar, hydro, etc) 12 VDC latching, bus powered from standard industry product (eg. Observant) output when required. | Max draw <400 mA, idle draw <5 mA, up to 24 valves. Local activation may optionally be allowed for example via a "user power on" mode. |
| Mains power 12 VDC continuous, powered full time from independent supply specified to suit type and number of valves on bus | Switching and power input to handle typical continuous active valve current, up to 24 valves. Local activation may optionally be allowed for example via a "user power on" mode. |
| Mains power 24 VAC continuous, powered full time from independent supply specified to suit type and number of valves on bus | Switching and power input to handle typical continuous active valve current and AC up to 24 valves. Local activation may optionally be allowed for example via a "user power on" mode. |

Local User Interface

In some embodiments, a local single momentary mechanical or capacitive touch button is the only means of user input, for example in order to keep the unit simple and mechanically robust. In some embodiments, a small OLED screen over moulded just under the surface provides an indication of the device status (for example whether a valve is open or closed) and address when the unit is powered, this screen may optionally be invisible to the user when not active.

A number of setup and test functions may for example be implemented via button gestures:

Setting of address (eg. long press to enter address set mode, long press to scroll address, short press to increment by 1, timeout to confirm and exit).

Setting of valve type (eg. short press followed by long press to enter valve set mode, short press to increment by 1, timeout to confirm and exit).

Testing of valve (eg. short press to toggle open/close).

Note the button input may for example be disabled in configuration via the serial interface to prevent tampering (eg. once commissioned and tested the button may be disabled remotely). In some embodiments, the device displays locality information, such as the address/irrigation zone.

Serial Interface Capability

In some embodiments, device operations can be controlled remotely, for example via an interface on a network of computers, such as that used by the Observant Global products. In some embodiments, device operations may be controlled by or local automation via serial communications bus and optionally for example via a telemetry device, for example such as the Observant telemetry platform (eg. C3, Solo, Pico).

Example implementation, functions and commands for a device according to the invention:

Connect to an Observant telemetry unit (ie. C3, Solo or Pico) via a SDI-12 or RS485 hardware layer.

Using the existing device driver capability commands can be sent and data retrieved over Observant Global via the telemetry unit.

Commands may for example include but would not be limited to:

Get status, including:
State (open, closed, unknown)
Pending state
Last current
Fault (none, solenoid OC, solenoid SC, solenoid transition fail, low voltage)

Set state (open/close)

Reset/clear fault

Set address

Set/get remote config, including:
Mode (latching 2 W, latching 3 W, continuous 2 W, continuous 3 W)
Pulse (short, med, long)
Config bitflag (allow button action, screen on, permanent power, lock address, . . . )

Get reset reason

Get hardware version

Get firmware version

In some embodiments, the connector of the invention substantially reduces or eliminates the need for user configuration. As an example, a user may purchase a cable to interface a tipping-bucket rain gauge, which when plugged into a base monitoring and telemetry unit such as Observant's C3 which will auto-detect the cable, interrogates it, determines the type of cable (and specifically what type of rain gauge cable) it is, then propagates this information through the stack, ending in the presentation of a default visualization and history for rainfall. The configuration of the rain gauge in this sense is taken care of when the customer selects the cable from those that are available, and that's the only input needed from the customer.

In some embodiments, there is provided an overall hardware and firmware platform comprising one or more connectors according to the invention. Such a platform has as much commonality as possible, re-using circuitry design and firmware across variants and even the PCB design (for example for the connector). In some of these embodiments, variants of the connector might be no more than a different code path, firmware flavor or component population difference. This provides large benefits for example in production volume, stock keeping, documentation and design maintenance.

Various IO types can be associated into functional groups based not only on sensor data interface type (digital, analog, serial etc), but also on sensor power supply requirements.

Examples of such functional groups include:

Solenoid:
Capacitive charge storage and h-bridge output stage.
Can fire typical latching solenoids when powered only from a standard 600 mA C3/Solo/Pico sensor power output.
Covers latching 12 VDC solenoids, and may extend to continuous 12 VDC solenoids where permanent power is available.
Loop powered 4-20 mA
20 V output
Low-side 4-20 mA measurement circuitry
Sense resistor value typical of 4-20 mA systems.
Covers any loop powered 4-20 mA sensor (eg. Ozisense pressure)
Counter
Continuous low-power operation without permanent power (eg. Onboard power storage is periodically 'refreshed' during the update from the telemetry platform.)
Passive pulse counting and input state detection only.
Covers tipping bucket rain gauges, pulse flow meters, any other dry-contact, pulse output devices.
Powered Sensor
Adjustable, switched and current limited sensor power output (eg. 3V up to supply voltage—12 V @ 500 mA)
Sensor serial communications (eg. SDI-12, RS485, RS232, logic level serial)
This variant would also cover analog voltage input (eg. 0-10V) as they are typically powered sensors and sense voltage can share a physical connection with an unused serial comms connection.
Covers soil moisture probes, weather station components, crop health sensors, third-party controller interfaces and voltage output devices.

In some embodiments, the device of the invention comprises a bare ended sensor/solenoid connection. Such a connection allows the installer to use a connection technique of their own choice for the final connection to the existing device, in the case where the smart cable is to be packaged with the sensor device this connection could be integral to both devices.

In some embodiments the device of the invention comprises daisy-chainable circular M8 4-way connector based communications and power connection. Such an IP rated connector type allows standard cable sets to be used, and in this example is able to be installed within standard ½" US electrical conduit.

In some embodiments the device of the invention comprises a rugged local UI comprised of OLED display and hybrid tactile mechanical and touch interface. In order to increase robustness of the user interface to environmental factors (eg. water, mud, dirt, flora/fauna) a combination of a single mechanical tactile push-button for wake-up and confirmation functions, and a 4-way touch gesture array for menu navigation and parameter adjustment is employed. Thus in some embodiments multiple inputs can be given to a single push button by pushing in one of 4 directions on the edge of the button.

The device of the invention may also comprise unpowered bus wakeup signalling for example over RS485 electrical connection to allow low power operation in conjunction with readily available user interactivity. In such embodiments, a mechanical tactile push-button may be used to signal to the host controller that the user wishes to interact with the smart cable, which in turn supplies power to the smart cable to enable the screen, touch gesture and sensor functions of the smart cable outside of the scheduled update frequency.

Certain implementations of the invention allow for multiple installation options, for example:

a) Free hanging in-line. This installation option may be used for example where equipment is in an enclosure or access pit. The smart cable can be installed without any conduit or junction box where the sensor device is buried, or otherwise housed in a pit or box that offers basic protection from flora/fauna, UV and other environmental influences.

b) Internal to standard conduit junction box. This installation may for example be used where additional cabling protection is desired or cabling is to be routed above ground or attached to existing mechanical infrastructure. The smart cable can be housed within standard electrical junction boxes, including ½" US access port style.

c) Fascia mount on standard junction box. This installation may be used as above and additionally where the user desires the user interface to be visible and readily accessible for regular use but still requires cabling protection. The smart cable can be mounted to the face of an electrical junction box, as shown in FIGS. 4b and 4c with ½" US access port.

EXAMPLE 1

Possible Wiring

Figure 9:
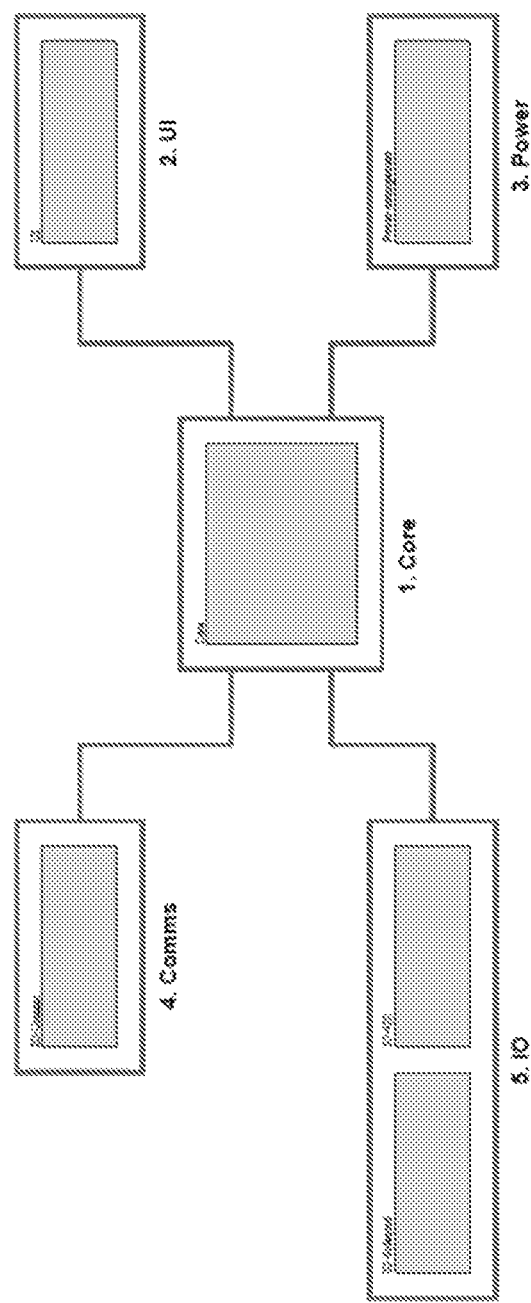
FIG. 9 depicts an example schematic layout showing electronic elements for a connector according to the invention.
Figure 10:
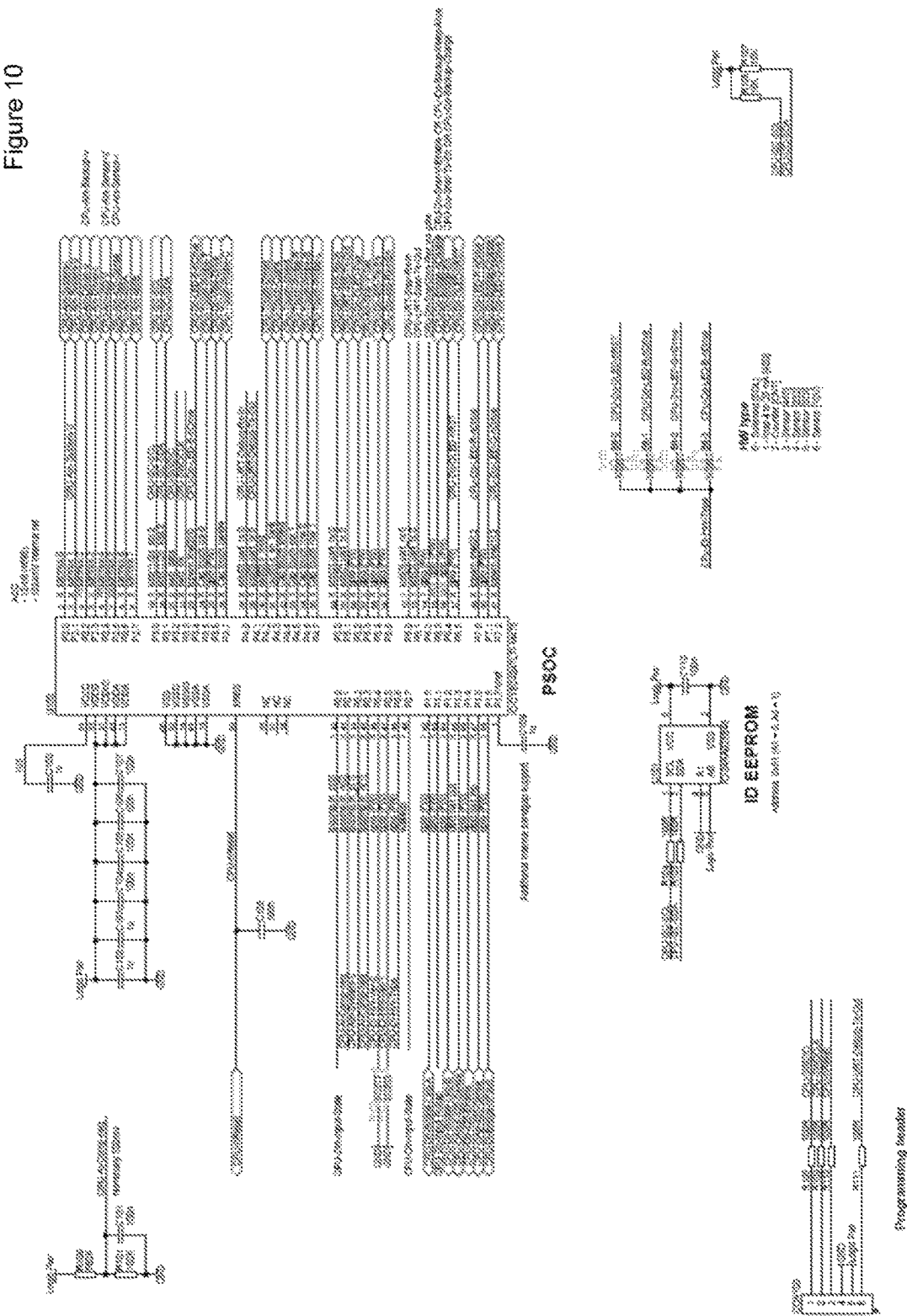
FIGS. 10 to 20 show example electronic circuit diagrams for the components shown in FIG. 9.
Figure 11:
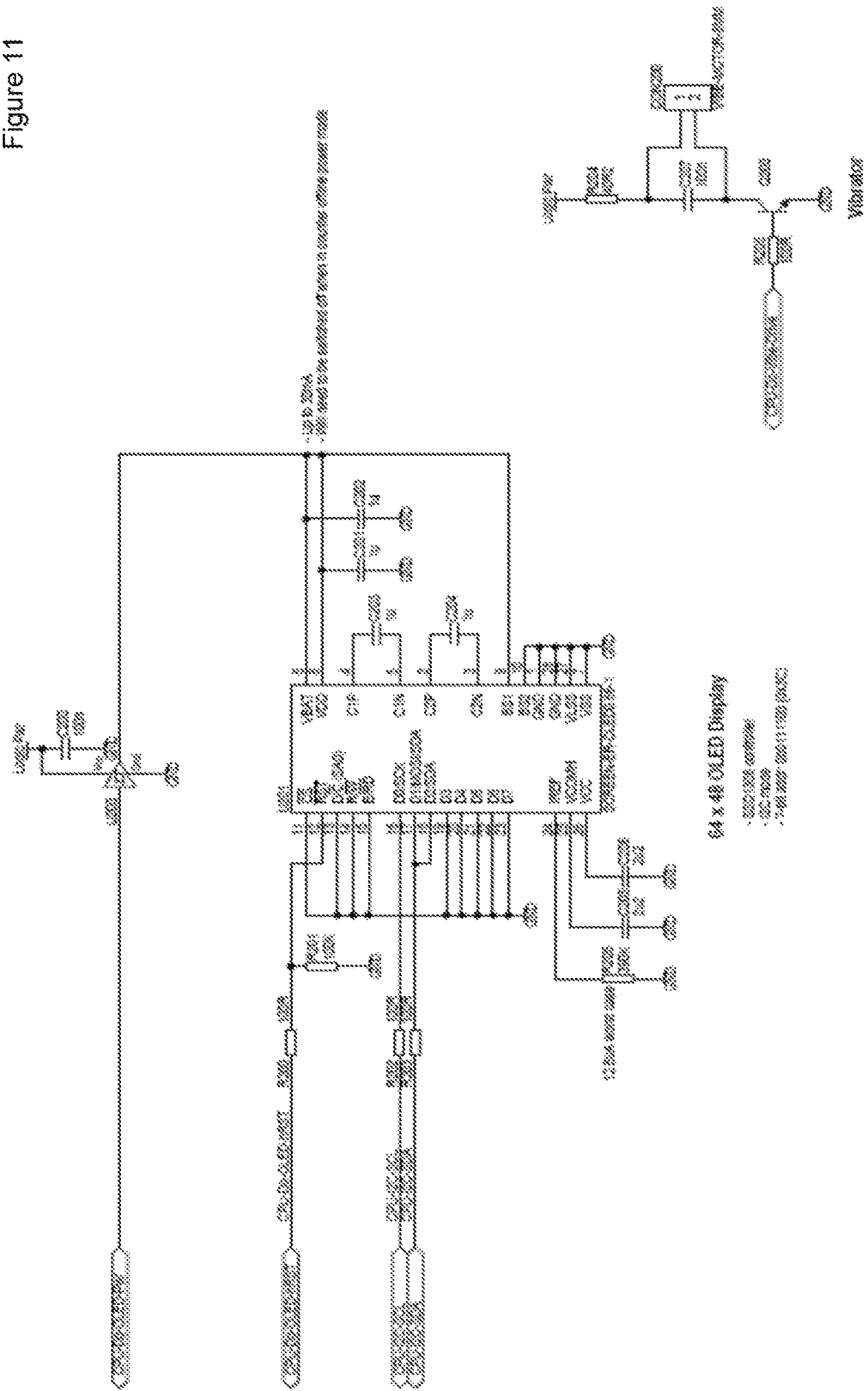
Figure 12:
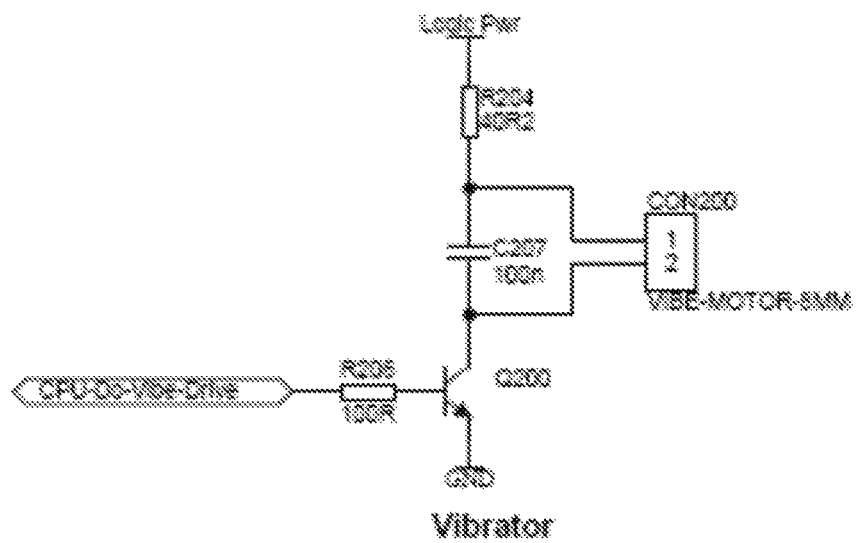
Figure 13:
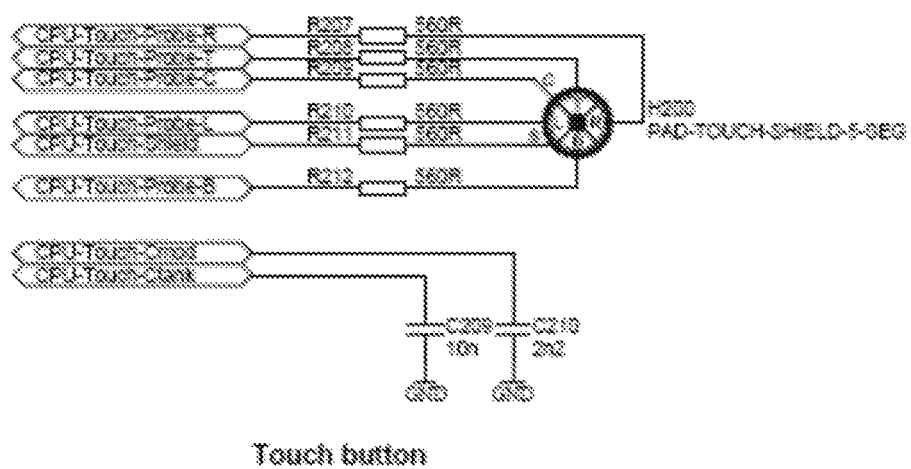
Figure 14:
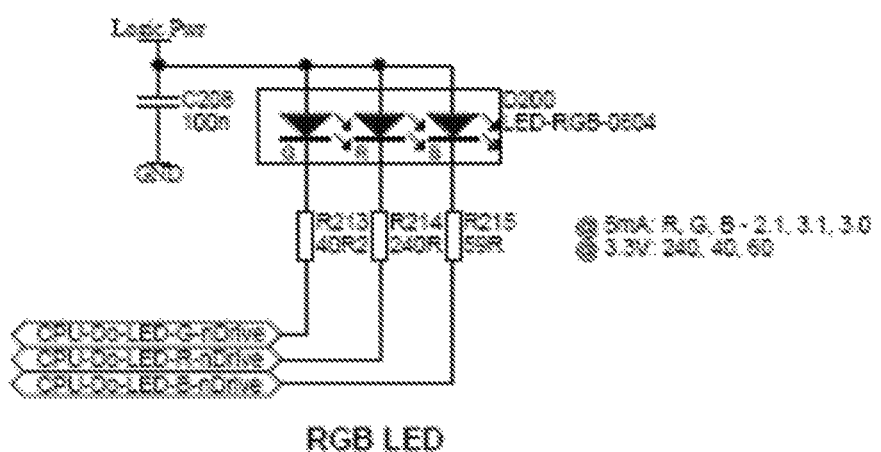

FIG. 9 depicts an example schematic layout showing electronic elements for a connector according to the invention. FIGS. 10 to 20 show example electronic circuit diagrams for the components shown in FIG. 9. The skilled addressee will appreciate that the circuit diagrams herein represent only one of many possible implementations of the invention.

It can be seen from FIG. 9 that there are 5 parts to these example circuitry diagrams as follows:

| | |
|---|---|
| 1. Core | FIG. 10 |
| 2. UI | FIGS. 11-44 |
| 3. Power management | FIG. 15 |
| 4. Communications | FIG. 16 |
| 5. Input Output (IO) | FIGS. 17-20 |

Figure 15:
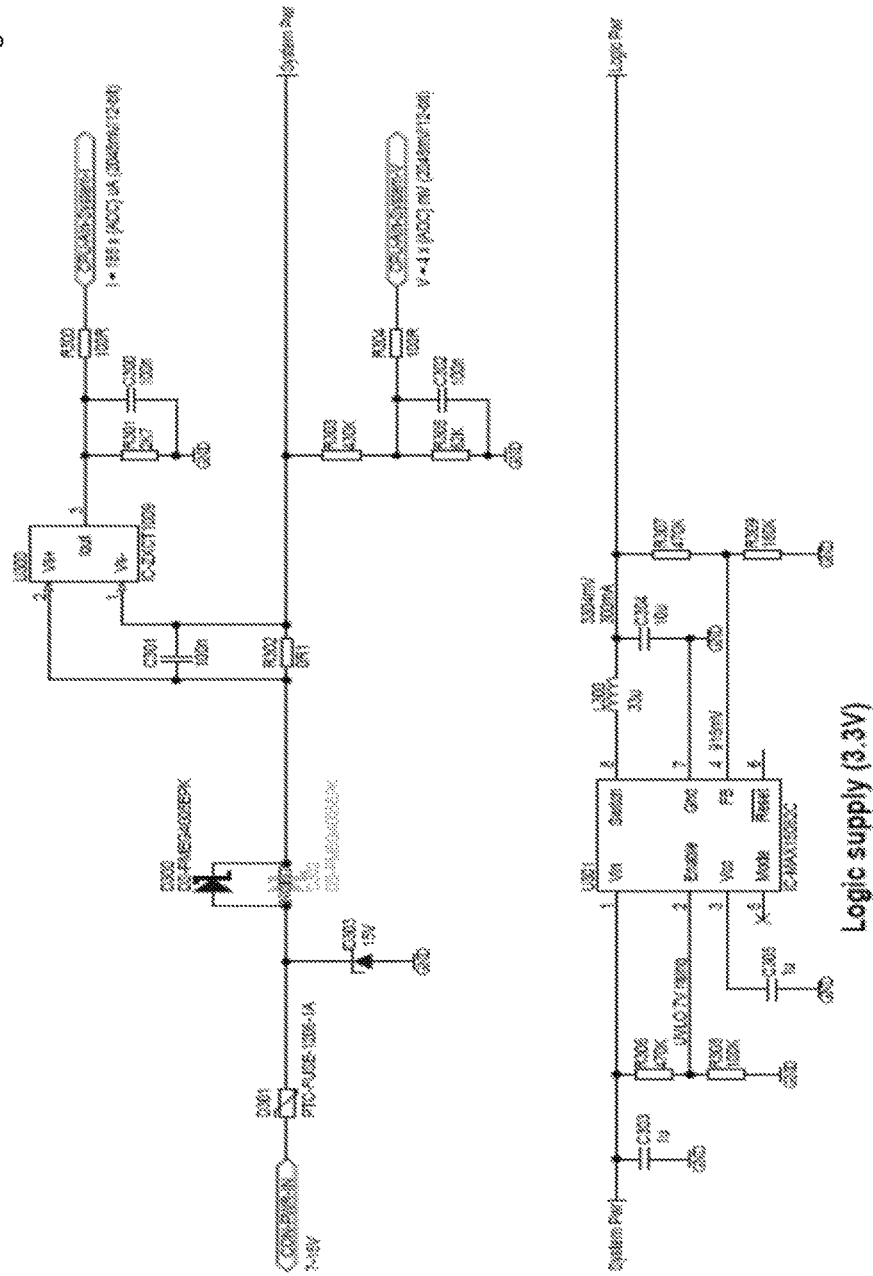
Figure 16:
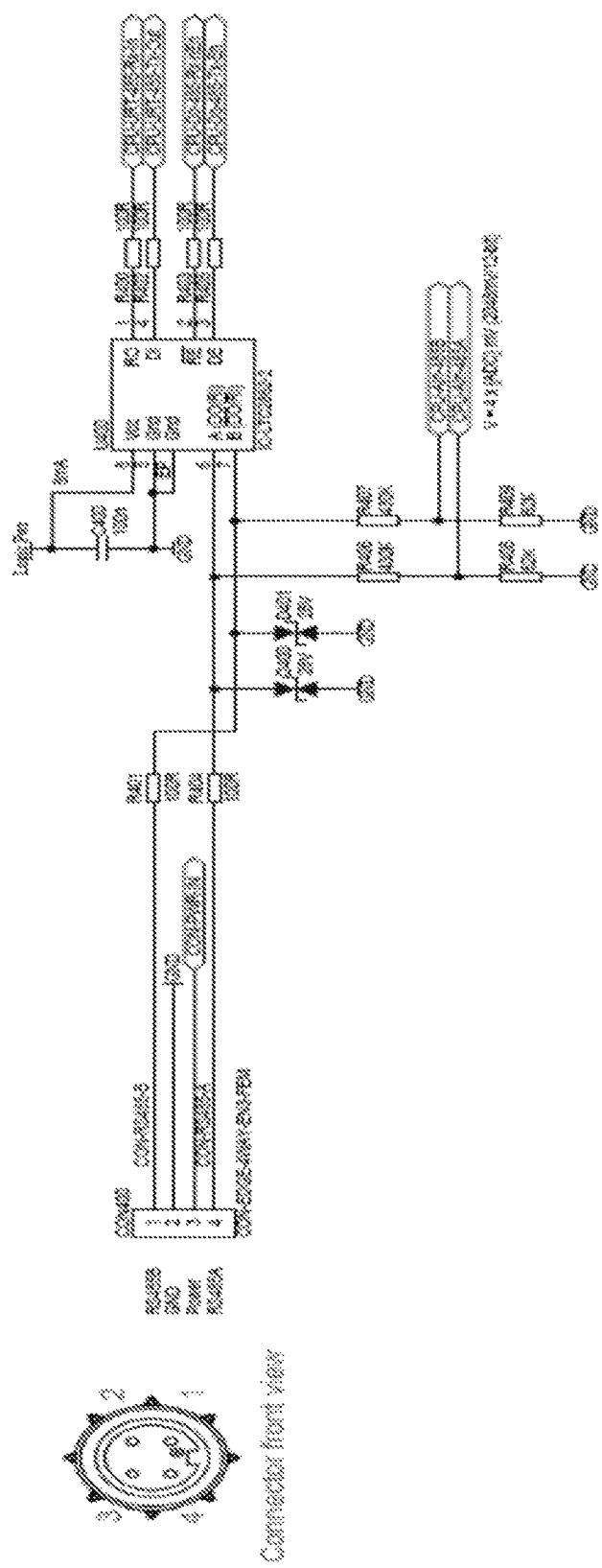
Figure 17:
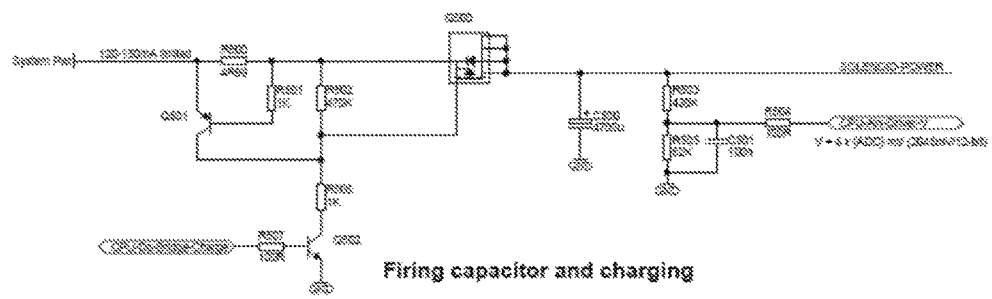
Figure 18:
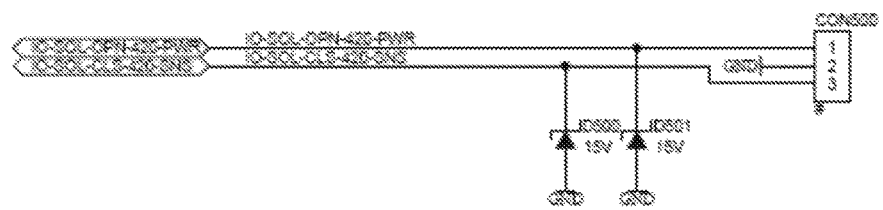
Figure 19:
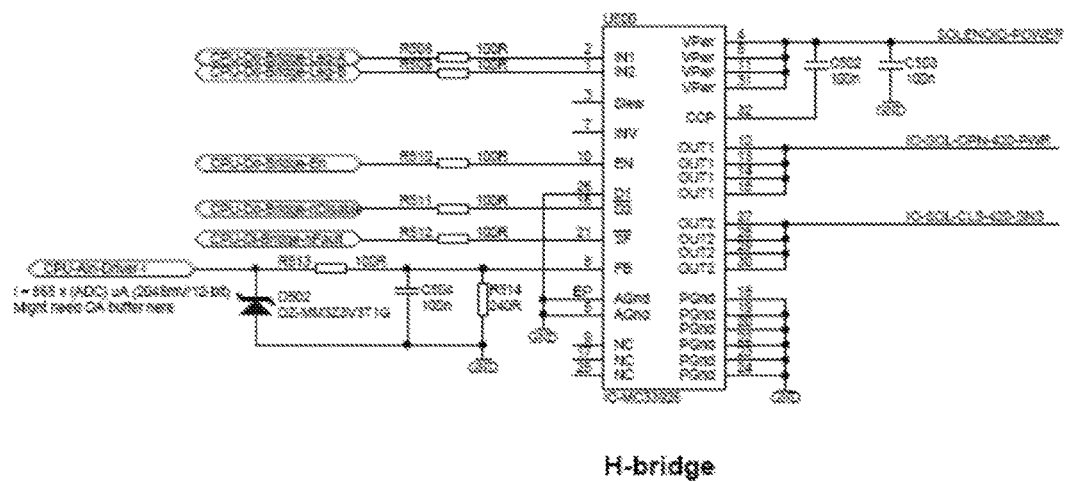
Figure 20:
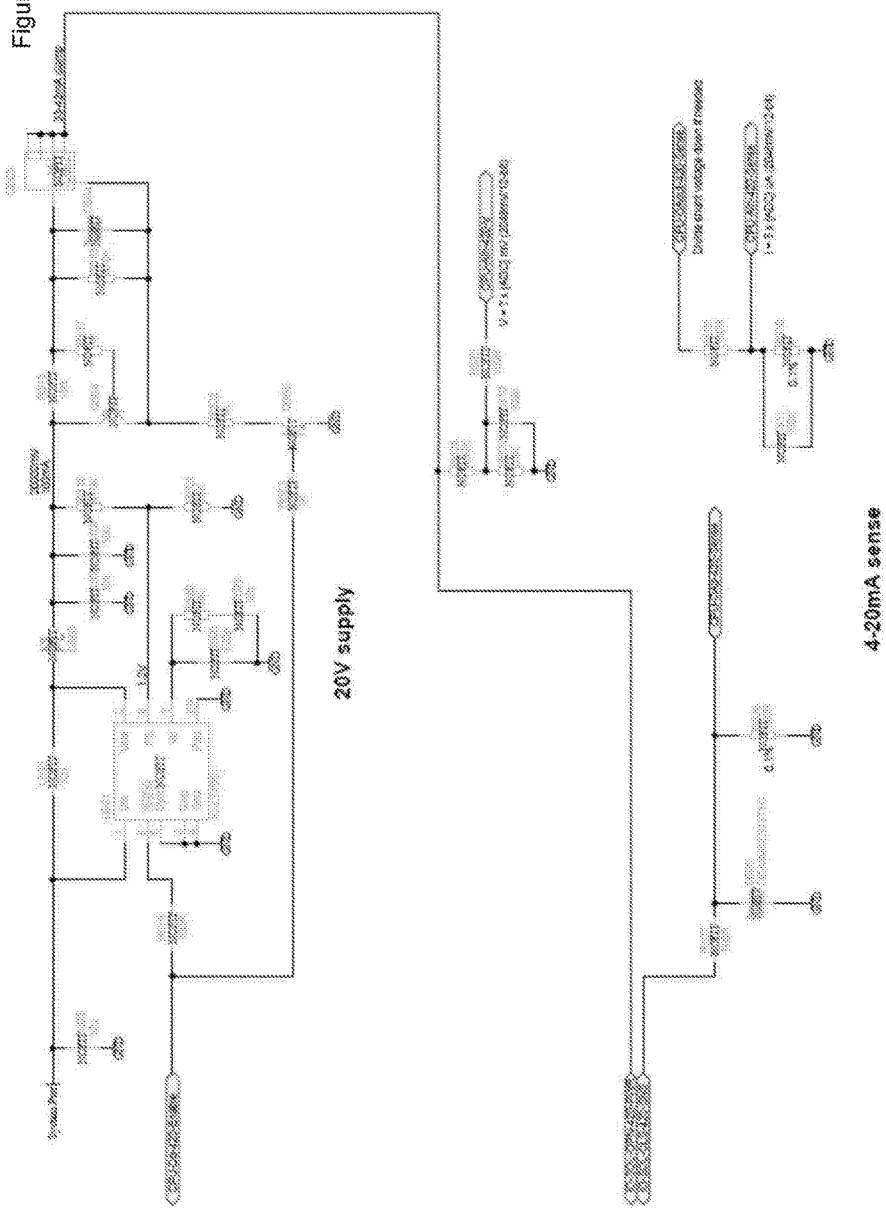

FIGS. 11-14 depict diagrams in relation to the OLED display, vibrator, touch button and RGB LED respectively. FIG. 15 depicts an example logic supply and FIG. 16 depicts communications wiring. FIGS. 17-20 depict firing capacitor and charging, 2 W or 3 W connector, an H bridge, 20V supply and 4-20 mA sensor wiring respectively.

Example 2

Possible Alternative Wiring

Figure 21:
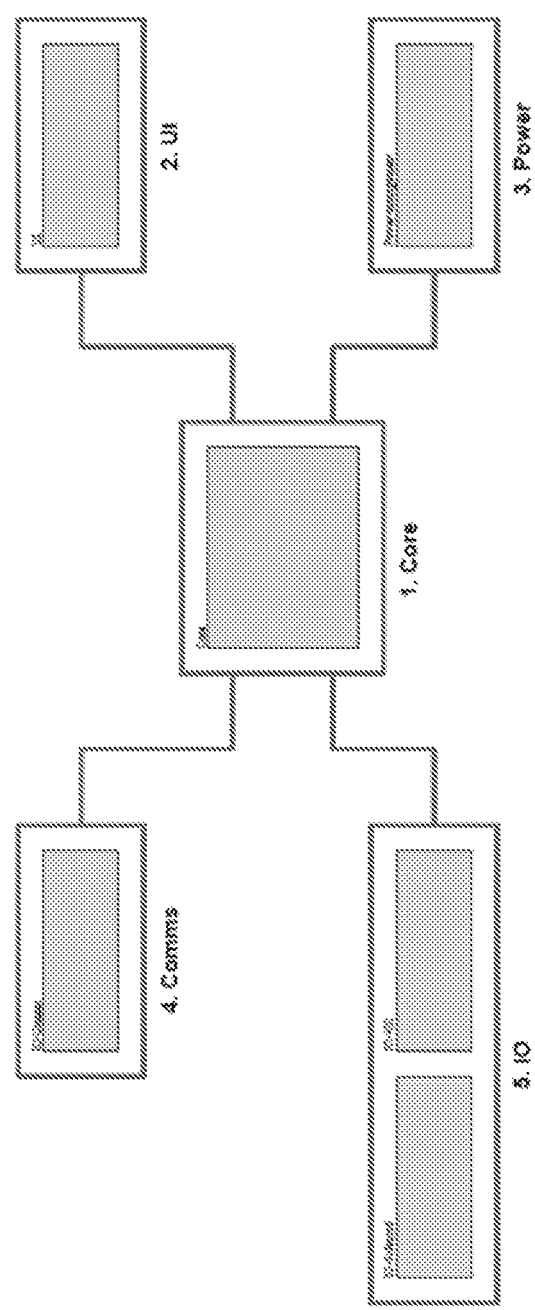
FIG. 21 depicts an example schematic layout showing electronic elements for a connector according to the invention.

FIG. 21 depicts an example schematic layout showing electronic elements for a connector according to the invention. FIGS. 22 to 28B show example electronic circuit diagrams for the components shown in FIG. 21. The skilled addressee will appreciate that the circuit diagrams herein represent only one of many possible implementations of the invention.

Figure 22:
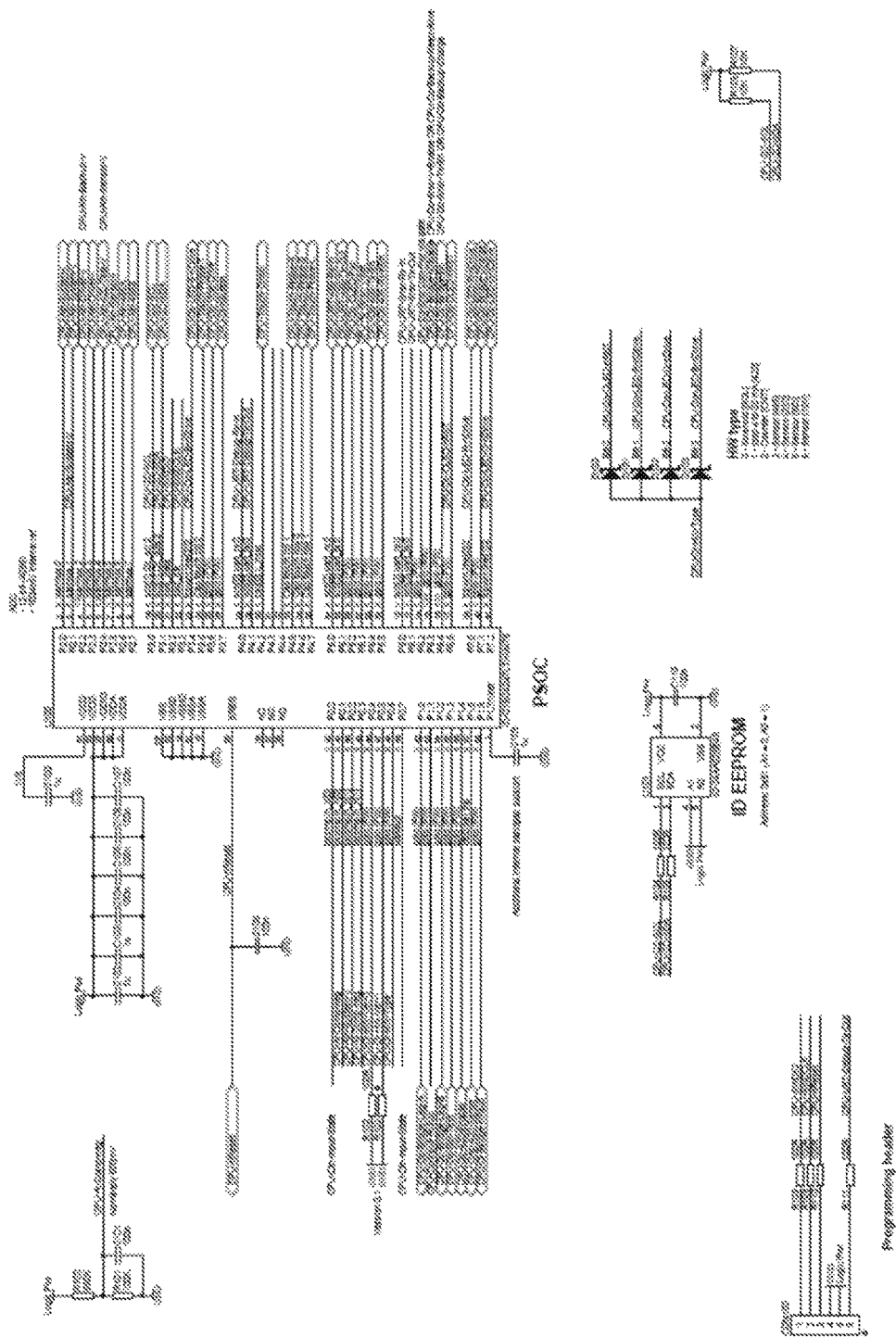
Figure 23:
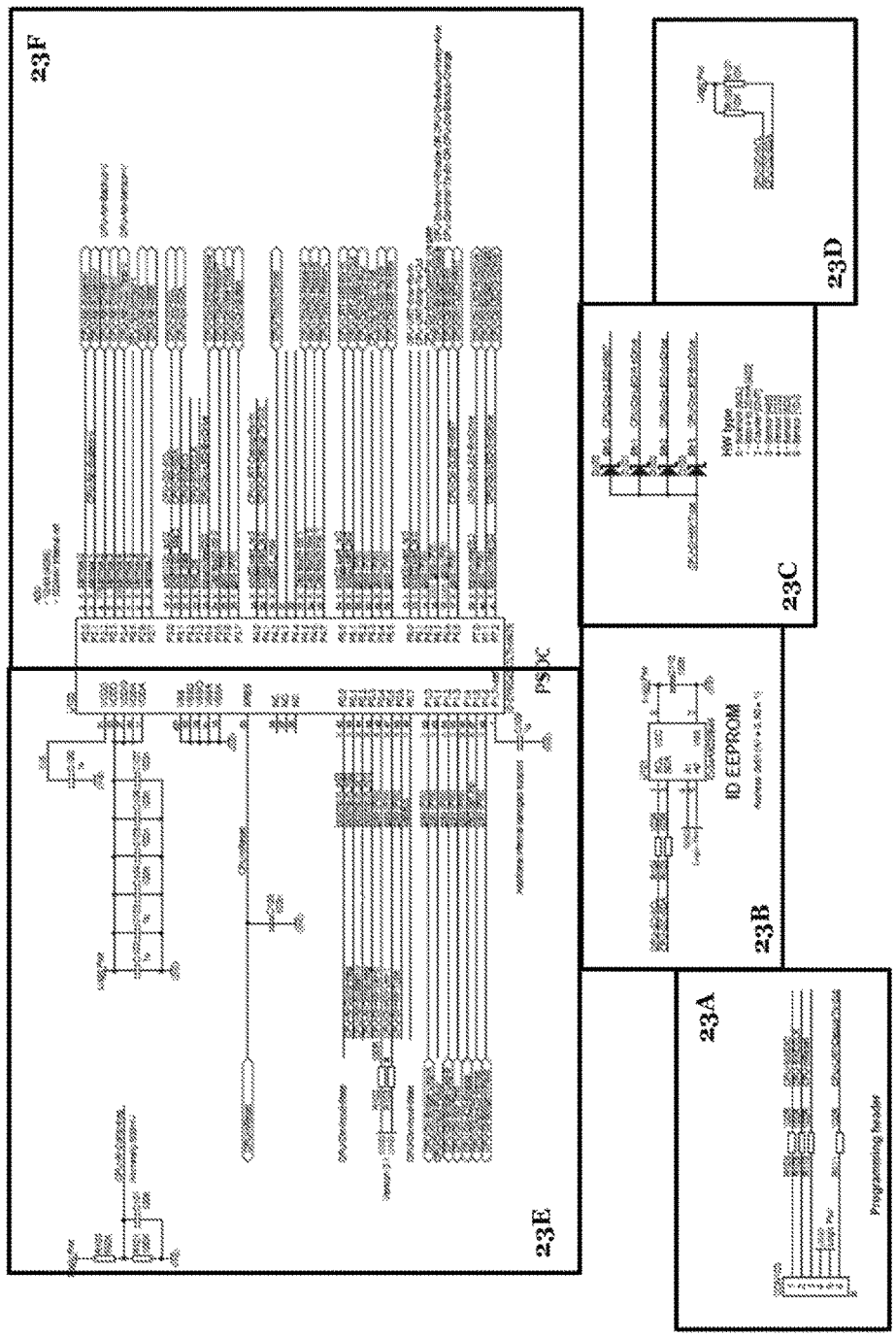
Figure 23A:
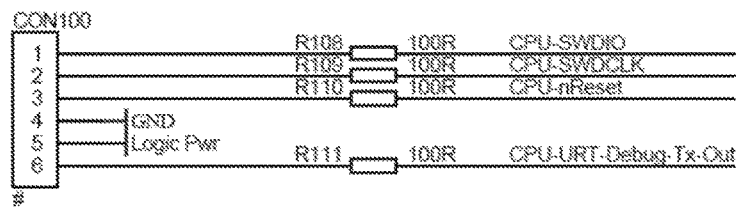
Figure 23B:
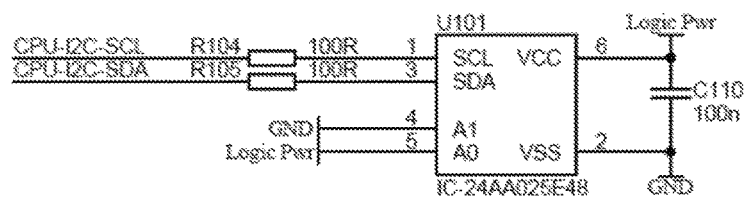
Figure 23C:
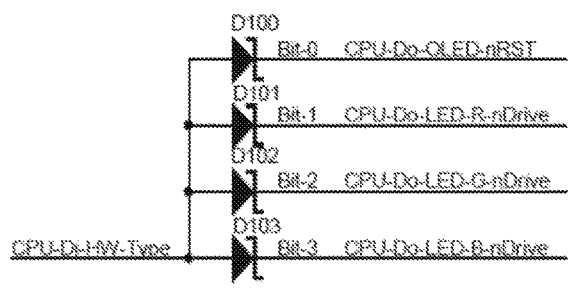
Figure 23D:
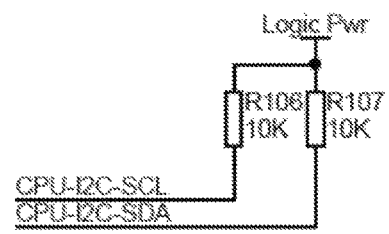
Figure 23E:
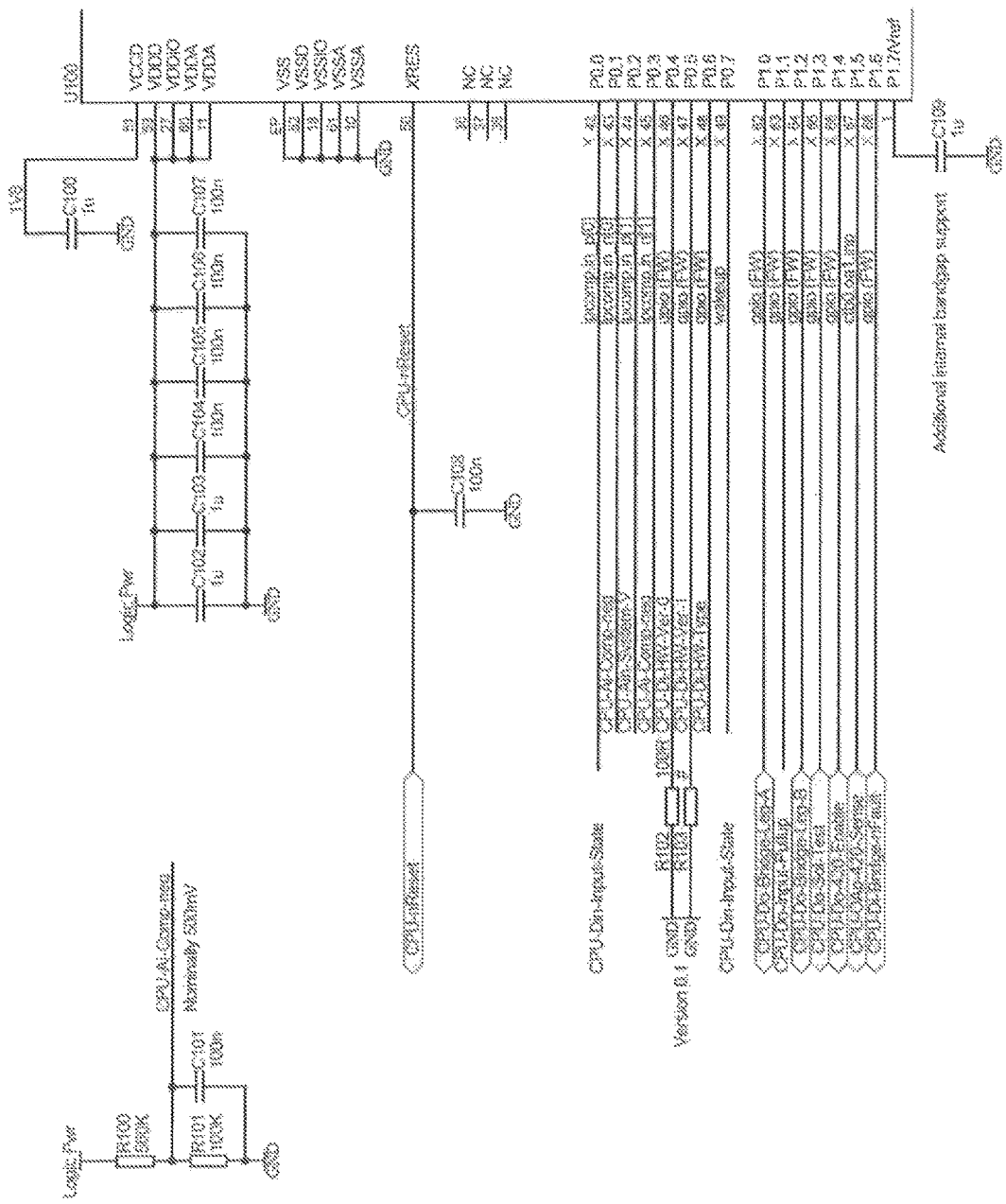
Figure 23F:
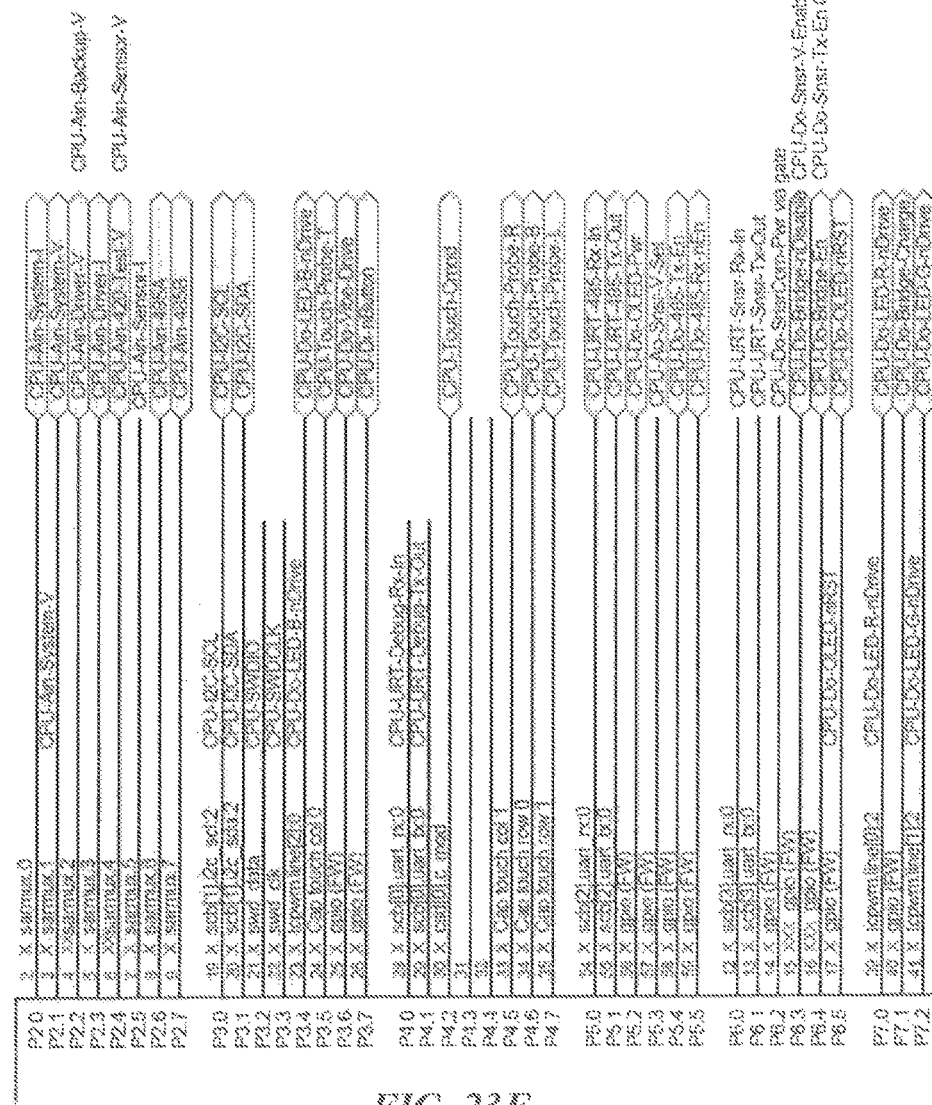
Figure 24A:
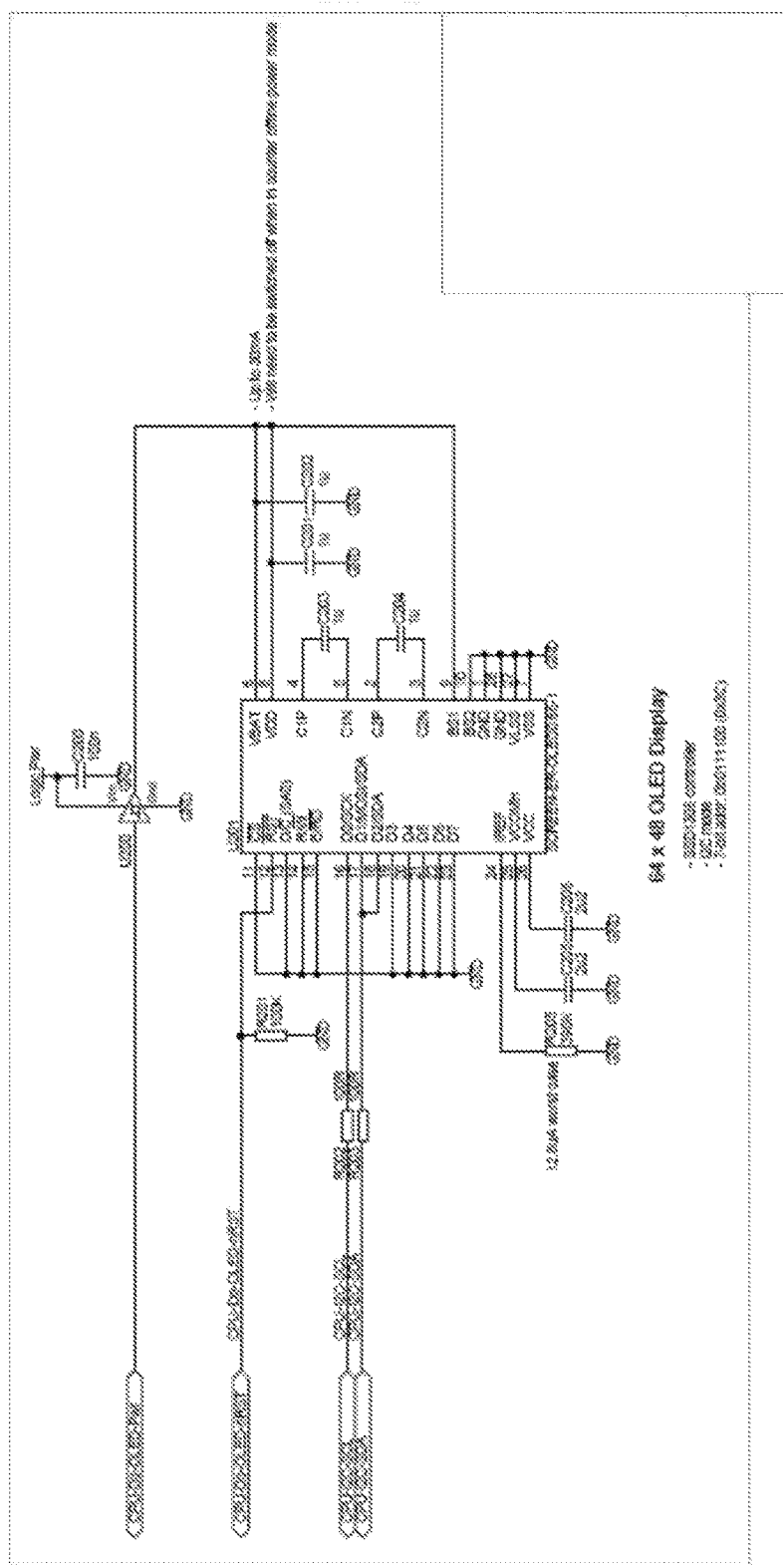
Figure 24B:
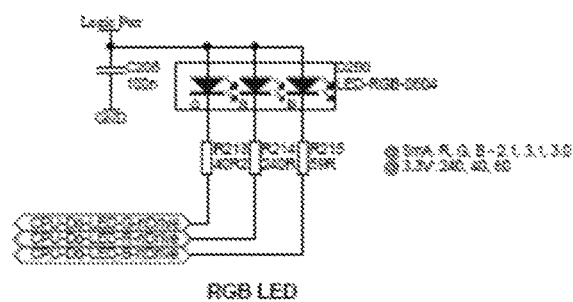
Figure 24C:
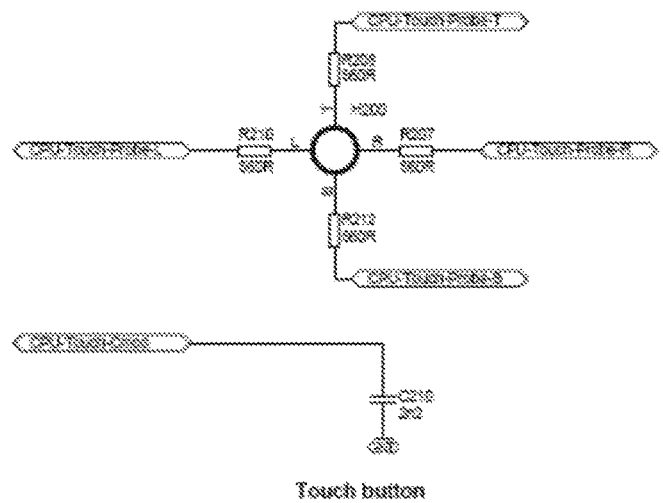
Figure 24D:
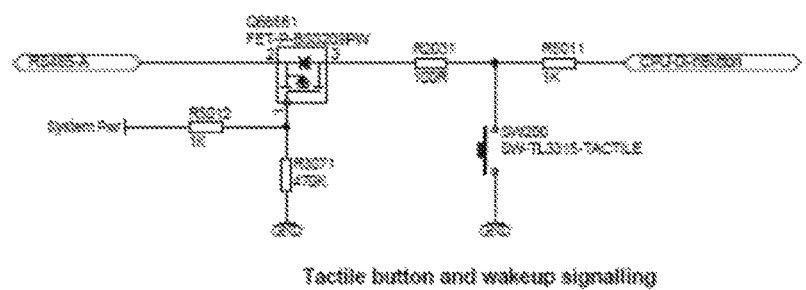
Figure 25:
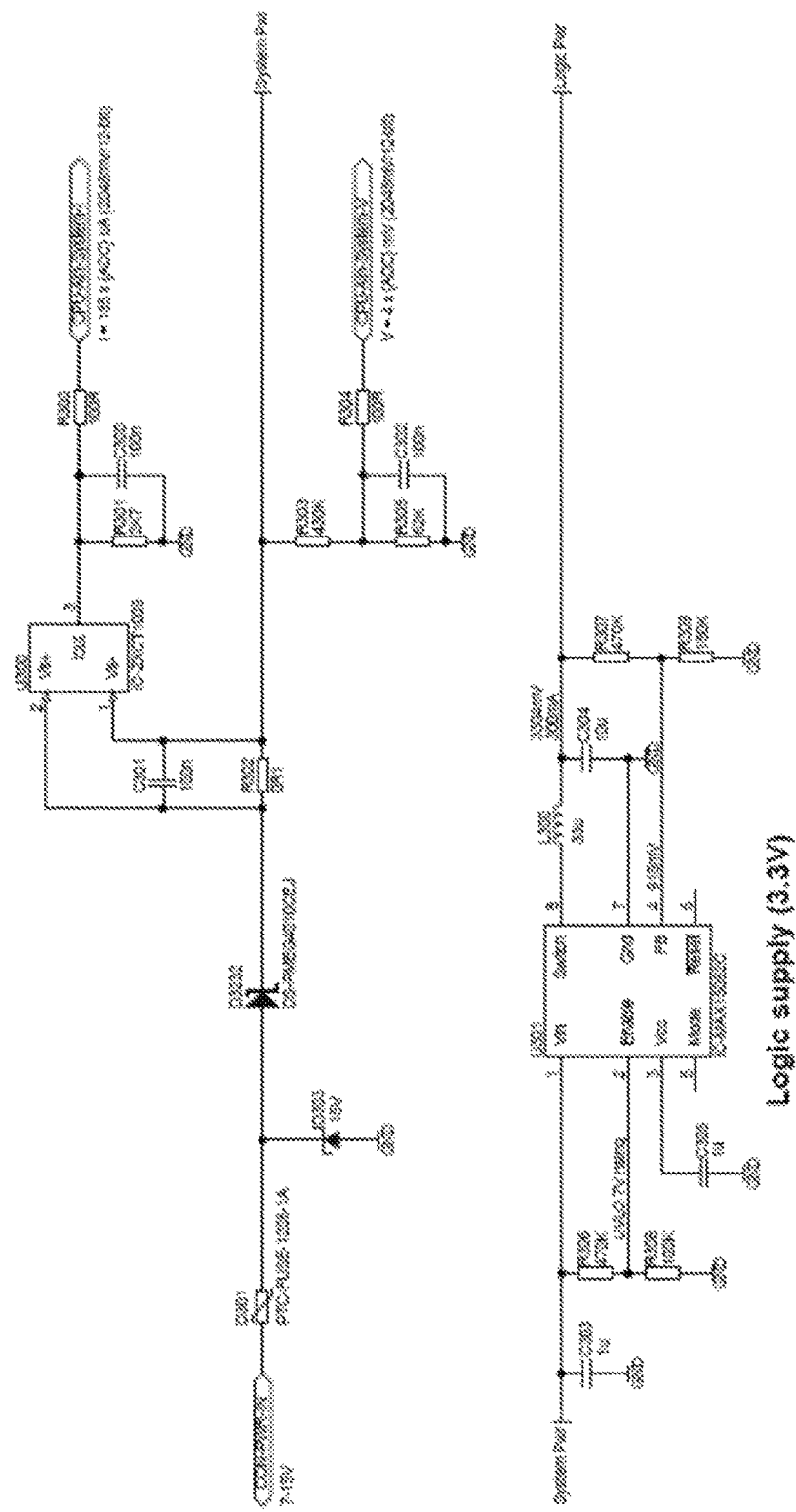
Figure 26:
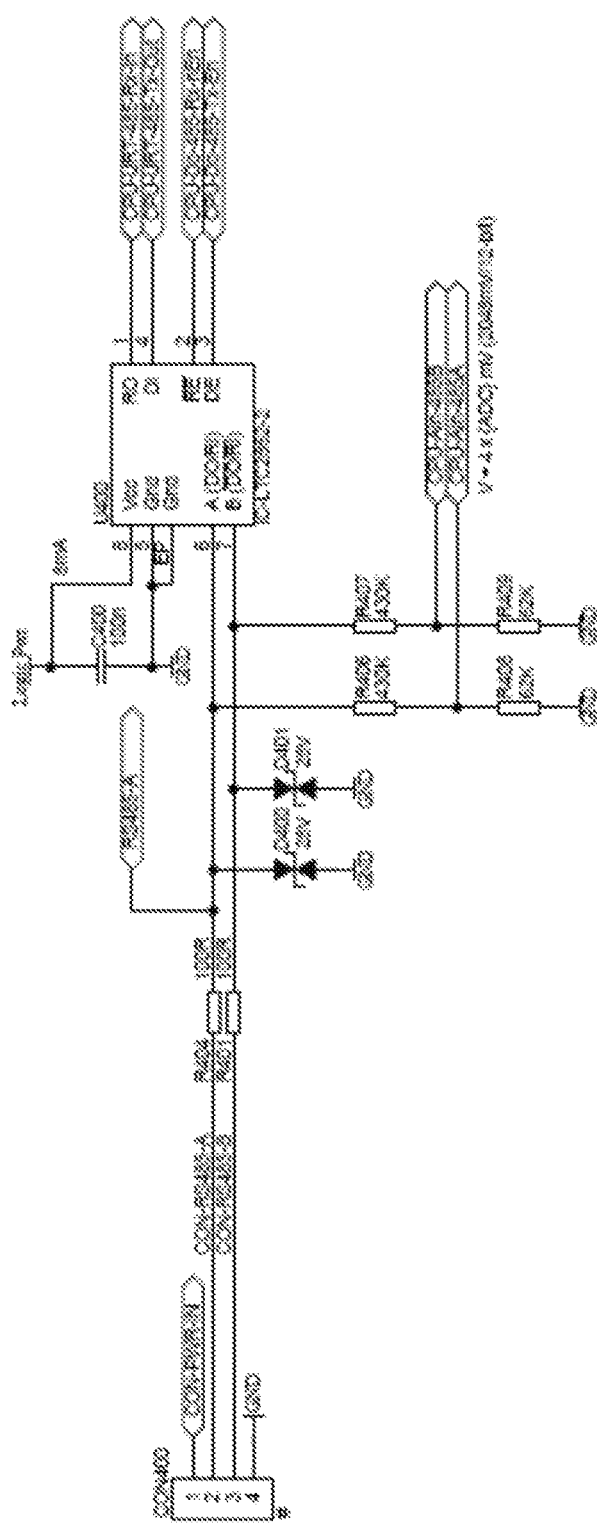

It can be seen from FIG. 21 that there are 5 parts to these example circuitry diagrams as follows:

| | | |
|---|---|---|
| 1. | Core | FIGS. 22-23F |
| 2. | UI | FIGS. 24A-24D |
| 3. | Power management | FIG. 25 |
| 4. | Communications | FIG. 26 |
| 5. | Input Output (IO) | FIGS. 27A-28B |

FIG. 22 shows an overview of the Core and is not intended to be read in detail. FIG. 23 is identical to FIG. 22 but shows how each element of FIG. 23 is displayed in subsequent figures, being: Programming header (FIG. 23A), ID EEPROM (FIG. 23B), HW type (FIG. 23C) and the details of FIGS. 23D, E and F.

Figure 27A:
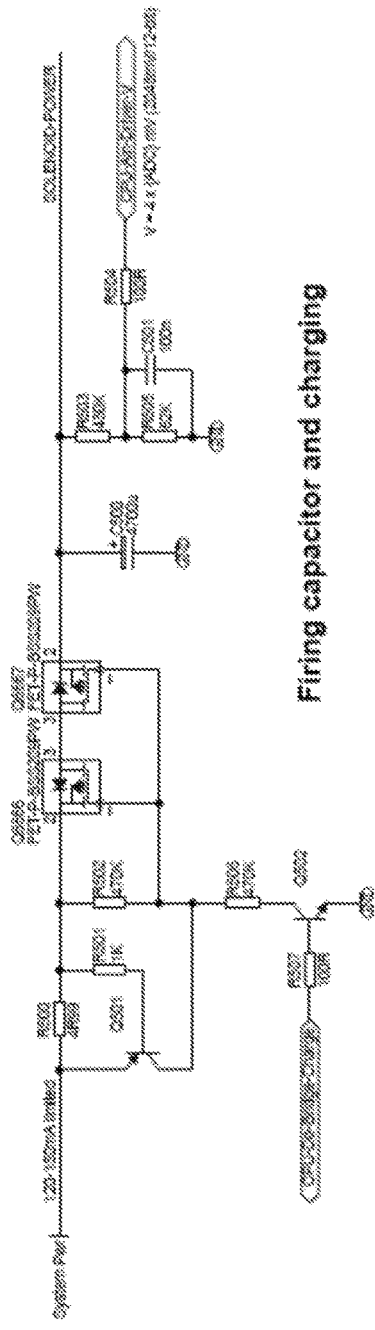
Figure 27B:
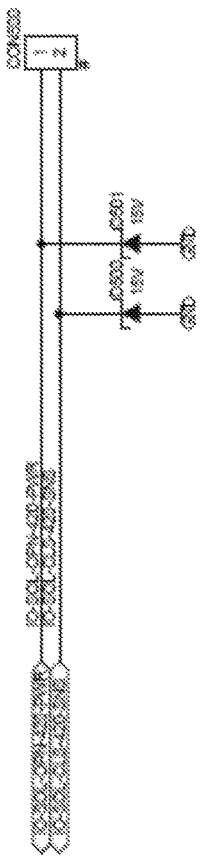
Figure 28B:
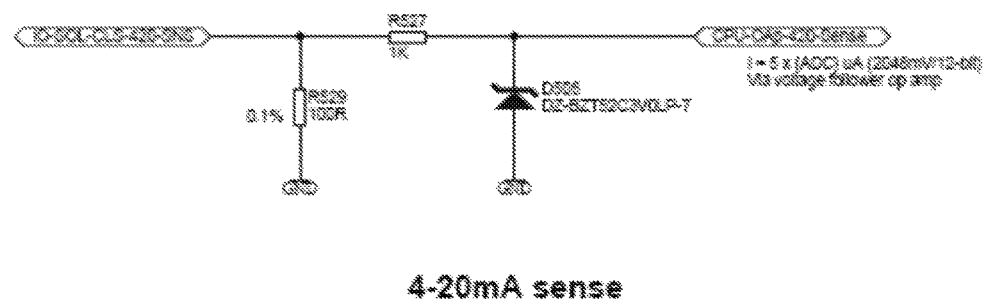

FIGS. 24A-24D depict diagrams in relation to the OLED display, RGB LED, touch button, tactile button and wakeup signaling respectively. FIG. 25 depicts an example logic supply and FIG. 26 depicts communications wiring. FIGS. 27A-28B depict firing capacitor and charging, 2 wire connector, an H bridge. FIG. 27 is a map showing the interaction of the elements shown in more detail in FIGS. 27D and 27E, being the H bridge and continuity check stimulation. FIGS. 28A and 28B show wiring for the 20 V supply and 4-20 mA sensor.

The invention claimed is:

1. A connector for physically connecting a plurality of devices, comprising:
   a plurality of connection elements enabling physical connections with the plurality of devices;
   a user interface;
   a processor to execute machine readable instructions stored in a memory;
   a communication interface enabling the connector to transmit and or receive a communication with at least one of the plurality of devices; and
   control circuitry communicatively coupled to the processor, the control circuitry configured to:
      receive and store power from one of the plurality of devices; and
      use at least some of the stored power to activate a different one of the plurality of devices;
   wherein the connector is configured to automatically sense physical connections with the plurality of devices and thereafter to execute at least one command for one or more of the plurality of devices, and the connector is further configured to automatically sense at least one type of device connected.

2. The connector as claimed in claim 1, further comprising an indicator for providing a visual feedback on the state of physical connection with one or more of the plurality of devices.

3. The connector as claimed in claim 2, wherein the indicator is a RGB LED indicator.

4. The connector as claimed in claim 1, wherein the user interface comprises a hybrid tactile mechanical and touch interface.

5. The connector as claimed in claim 4, wherein the hybrid tactile mechanical and touch interface comprises an over-moulded display unit and a mechanical tactile push button.

6. The connector as claimed in claim 1, wherein the processor executes machine readable instructions to control a first electronic device, the instructions including: code to store information, in relation to at least one additional electronic device; code to control the first electronic device to process signals from the at least one additional electronic device; and code to perform a function, of the first electronic device based on the processed signals output from the addition electronic device.

7. The connector as claimed in claim 6, the instructions further comprising: code to receive instructions from a user interface; code to cause display on a user interface; code to enable interoperability with at least one of the plurality of devices; and code to enable auto detection of at least one additional electronic device.

8. The connector as claimed in claim 4, wherein the connector is further configured to detect a plurality of input gestures of the hybrid tactile mechanical and touch interface, the plurality of input gestures comprising:
   a first input gesture configured to set an address of one of the plurality of devices;
   a second input gesture configured to set a valve type of one of the plurality of devices; and
   a third input gesture configured to test a valve of one of the plurality of devices.

9. The connector as claimed in claim 1, wherein the connector is further configured to:
   detect wiring faults for the plurality of devices; and
   detect whether a valve within the plurality of devices is open or closed.

10. The connector as claimed in claim 1, wherein:
    the plurality of devices comprises a plurality of solenoids; and
    the control circuitry comprises solenoid control circuitry.

11. The connector as claimed in claim 1, wherein;
    the user interface, the processor, the memory, the communication interface, and the control circuitry are contained within a waterproof enclosure comprising hardened resin; and
    the user interface is below a surface of the waterproof enclosure such that the user interface is visible through the waterproof enclosure when activated but is invisible when not activated.

* * * * *